United States Patent
Eugster et al.

(10) Patent No.: US 9,969,057 B2
(45) Date of Patent: May 15, 2018

(54) ABRASIVE MEANS

(71) Applicant: Robert Bosch GmbH, Stuttgart (DE)

(72) Inventors: Beat Eugster, Buhwil (CH); Georg Hejtmann, Mundelsheim (DE); Thomas Rohner, Kefikon (CH); Roman Zaech, Mettlen (CH); Thomas Kipfer, Matzingen (CH); Ralf Materna, Greifensee (CH); Adrian Schoch, Warth (CH); Jiri Misak, Dübendorf (CH); Petra Stedile, Esslingen (DE); Peter Eggenberger, Schönenberg (CH); Stefan Fuenfschilling, Öhningen (DE)

(73) Assignee: Robert Bosch GmbH, Stuttgart (DE)

( * ) Notice: Subject to any disclaimer, the term of this patent is extended or adjusted under 35 U.S.C. 154(b) by 30 days.

(21) Appl. No.: 14/901,071

(22) PCT Filed: Jun. 24, 2014

(86) PCT No.: PCT/EP2014/063244
§ 371 (c)(1),
(2) Date: Dec. 28, 2015

(87) PCT Pub. No.: WO2014/206967
PCT Pub. Date: Dec. 31, 2014

(65) Prior Publication Data
US 2016/0144480 A1    May 26, 2016

(30) Foreign Application Priority Data

Jun. 28, 2013 (DE) .................. 10 2013 212 609
Jun. 28, 2013 (DE) .................. 10 2013 212 617

(Continued)

(51) Int. Cl.
B24D 3/00 (2006.01)
B24D 5/00 (2006.01)
(Continued)

(52) U.S. Cl.
CPC ............... B24D 3/001 (2013.01); B24D 5/00 (2013.01); B24D 7/00 (2013.01); B24D 11/00 (2013.01);
(Continued)

(58) Field of Classification Search
CPC . B24D 3/001; B24D 5/00; B24D 7/00; B24D 11/0015; B24D 18/00; C09K 3/1409
(Continued)

(56) References Cited

U.S. PATENT DOCUMENTS 1,097,565 A * 5/1914 Straubel ............... B24D 5/12
451/41
2,194,546 A * 3/1940 Goddu .................. B24D 7/00
451/548
(Continued)

FOREIGN PATENT DOCUMENTS

EP      0 615 816 A1    9/1994
EP      1208945 A1 *    5/2002    ......... B05B 13/0235
(Continued)

OTHER PUBLICATIONS

International Search Report corresponding to PCT Application No. PCT/EP2014/063244, dated Sep. 2, 2014 (German and English language document) (5 pages).

*Primary Examiner* — George Nguyen
(74) *Attorney, Agent, or Firm* — Maginot, Moore & Beck LLP

(57) ABSTRACT

An abrasive member includes an abrasive member base and a plurality of abrasive particles applied to the abrasive member base. At least a large proportion of the abrasive
(Continued)

particles form an abrasive edge unit with an abrasive edge inclined at an angle between 0° and 90° relative to a defined working direction.

17 Claims, 21 Drawing Sheets

(30) Foreign Application Priority Data

| Jun. 28, 2013 | (DE) | 10 2013 212 634 |
|---|---|---|
| Jun. 28, 2013 | (DE) | 10 2013 212 641 |
| Jun. 28, 2013 | (DE) | 10 2013 212 670 |
| Jun. 28, 2013 | (DE) | 10 2013 212 684 |

(51) Int. Cl.
*B24D 7/00* (2006.01)
*B24D 11/00* (2006.01)
*B24D 15/00* (2006.01)
*B24D 18/00* (2006.01)
*C09K 3/14* (2006.01)

(52) U.S. Cl.
CPC ............ *B24D 15/00* (2013.01); *B24D 18/00* (2013.01); *C09K 3/1409* (2013.01)

(58) Field of Classification Search
USPC .......................................................... 451/541
See application file for complete search history.

(56) References Cited

U.S. PATENT DOCUMENTS

| 2,564,217 | A | * | 8/1951 | Taylor | B24D 5/12 451/541 |
|---|---|---|---|---|---|
| 2,982,006 | A | * | 5/1961 | Hodgson | B23D 67/00 407/29.13 |
| 3,229,427 | A | * | 1/1966 | Goodhew | B23B 51/06 408/57 |
| 3,246,430 | A | * | 4/1966 | Hurst | B24D 11/005 451/534 |
| 3,460,292 | A | * | 8/1969 | Ferchland | B24B 33/085 451/124 |
| 3,481,723 | A | * | 12/1969 | Rue | C09K 3/1409 51/298 |
| 3,510,990 | A | * | 5/1970 | Steindler | B24D 5/06 451/488 |
| 4,028,852 | A | * | 6/1977 | Harrington | D01B 1/06 451/541 |
| 5,453,041 | A | * | 9/1995 | Oliver | B24D 5/06 451/541 |
| 5,489,235 | A | * | 2/1996 | Gagliardi | B24D 11/00 451/527 |
| 6,330,737 | B1 | * | 12/2001 | Lowemark | B25B 27/24 29/213.1 |
| 6,821,196 | B2 | * | 11/2004 | Oliver | B24D 18/0009 451/544 |
| 8,568,206 | B2 | * | 10/2013 | Ramanath | B24D 7/06 125/15 |
| 9,440,332 | B2 | * | 9/2016 | Gaeta | B24D 11/04 |
| 2005/0048879 | A1 | * | 3/2005 | Skeem | B23D 61/18 451/56 |

FOREIGN PATENT DOCUMENTS

| JP | 2003-053672 A | 2/2003 |
|---|---|---|
| JP | 2006-205314 A | 8/2006 |

* cited by examiner

ABRASIVE MEANS

This application is a 35 U.S.C. § 371 National Stage Application of PCT/EP2014/063244, filed on Jun. 24, 2014, which claims the benefit of priority to Serial Nos. DE 10 2013 212 670.0, DE 10 2013 212 609.3, DE 10 2013 212 641.7, DE 10 2013 212 684.0, DE 10 2013 212 634.4 and DE 10 2013 212 617.4, all filed on Jun. 28, 2013 in Germany, the disclosures of which are incorporated herein by reference in their entirety.

PRIOR ART

A large number of abrasive means in which abrasive particles have been applied to an abrasive means backing by means of a scattering process and are present on the abrasive means backing in different orientations are already known. In particular, the abrasive means according to the prior art comprise abrasive particles having an abrasive tip and/or having abrasive edges, which are provided in order to remove material from a workpiece.

Different methods for applying abrasive particles to an abrasive means backing have already been proposed, in which the abrasive particles are scattered onto an abrasive means backing. The abrasive particles are fundamentally scattered such that they are arranged on the abrasive means backing in different random orientations after having been scattered. Due to the different random orientations of individual abrasive particles scattered over the abrasive means backing, the abrasive particles in an abrading operating mode are arranged at different angles of individual abrasive edges and/or abrasive tips to a workpiece to be machined and therefore have a different abrasive capacity.

DISCLOSURE OF THE INVENTION

An abrasive means having an abrasive means backing and a plurality of abrasive particles applied thereto, of which at least a large proportion form at least one abrasive edge unit having an abrasive edge inclined at an angle between 0° and 90° relative to a defined machining direction, is proposed. In particular the angle relative to the defined machining direction is at least 10°, especially at least 20°, preferably at least 30°, particularly preferably minimally 40° and a maximum of 80°, advantageously a maximum of 70°, preferably a maximum of 60°, and particularly preferably a maximum of 50°.

An "abrasive means" is to be understood to mean in particular a unit having at least one abrasive means backing and abrasive particles applied and fastened thereto, which unit is intended in an abrasion process to remove material from a surface of a workpiece to be machined. In particular, the abrasive means is intended for a machining of a workpiece by means of an abrasive machine, however the abrasive means in principle may also be intended for manual abrasion. An "abrasive means backing" is to be understood to mean in particular a flexible backing, for example a velour sheet, a paper, a textile fabric, or in principle also a solid backing, for example a ceramic sheet, to which the abrasive particles are applied and fastened and which is preferably intended to be fastened to an abrasive machine, but in principle may also be intended for manual abrasion. An "abrasive particle" is to be understood to mean in particular a preferably ceramic, crystalline and/or metal body having at least one abrasive edge. A ceramic abrasive particle may be produced for example partially or wholly from aluminum oxide, zirconium oxide, silicon nitride, silicon carbide or another ceramic material. Depending on a desired application and a desired degree of fineness, the abrasive particles have a diameter between ten millimeters and half a micrometer. In particular, the abrasive particle may have a defined geometry. The term "abrasive particles having a defined geometry" is to be understood to mean in particular abrasive particles that at least substantially have an identical and predetermined shape, for example a rod shape or tetrahedral shape. In particular, abrasive particles having a defined geometry have been produced by a process that purposefully produces abrasive particles having the at least substantially predetermined shape. An "at least substantially identical shape" is to be understood to mean in particular that the abrasive particles have an identical shape and preferably an identical size apart from deviations caused by the production process. The term "at least a large proportion of the abrasive particles" is to be understood to mean in particular a proportion of at least 60 percent, advantageously at least 70 percent, preferably at least 80 percent, and particularly preferably at least 90 percent of the abrasive particles. An "abrasive edge unit" is to be understood to mean in particular a unit intended for chip removal. In particular, the abrasive edge unit may have a plurality of abrasive particles, which in particular are arranged in a row, preferably directly adjacently on the abrasive means backing, wherein the abrasive edge is formed by edges of the abrasive particles. Further, the abrasive edge unit may be formed from an edge of an individual abrasive particle. In particular, the abrasive means may have a plurality of rows of adjacent abrasive particles, which each form an abrasive edge unit and are preferably inclined at the same angle relative to the defined machining direction. The rows are preferably arranged at a uniform distance from one another. An "edge of an abrasive particle" is to be understood to mean in particular a portion of the abrasive particle in which two surfaces of the abrasive particle converge and which is described substantially by a straight or curved line. An "abrasive tip of an abrasive particle" is to be understood to mean in particular a portion of the abrasive particle in which at least three surfaces of the abrasive particle converge and which is formed substantially as a point. The term "substantially as a point" is to be understood to mean in particular that the portion has a surface that corresponds at most to one percent, advantageously a thousandth of a smallest surface of the abrasive particle. In an idealized case, the abrasive tip is formed by an individual atom of a material of the abrasive particle. The expression "the abrasive edge is inclined at an angle between 0° and 90° relative to a defined machining direction" is to be understood to mean in particular that the abrasive edge extends in such a way that the row of adjacent abrasive particles extends at an angle between 0° and 90° to the defined machining direction and said particles thus act on the workpiece at this angle and/or the edges of the individual abrasive particles are oriented at this angle to the defined machining direction and thus act on the workpiece at this angle. In particular, the abrasive edge extends parallel to a surface of the abrasive means backing. In particular, the angle is greater than 0° and less than 90°. In particular, by an inclination of the abrasive edge at an angle between 0° and 90° relative to a defined machining direction, an abrasive edge advantageously can be achieved that removes material in a chip-producing manner from a surface of a workpiece by means of what is known as a "shearing cut". A "defined machining direction" is to be understood to mean in particular a defined direction, along which the abrasive means is moved forward and/or backward in order to machine the surface of the workpiece and in which a specific machining pattern of the surface is produced. In particular, another type of machining pattern of the surface is produced when the abrasive means is moved in a direction different from the defined machining direction. A "machining pattern" is to be understood to mean in particular a surface quality produced by a fixed number of machining passes on the workpiece, on the basis of which surface quality different machining qualities of abrasive means can be distinguished. In particular, the produced surface quality is dependent on a cut characteristic of an abrasive edge, wherein, in the case of a cut characteristic that is different from a cut characteristic of a shearing cut, the likelihood of a breaking-off of surface pieces and/or of a tearing of fibers of a material of the surface in addition to the chip-producing removal is increased. The abrasive edge unit may be formed in particular by abrasive particles having abrasive tips arranged in a row, wherein the abrasive edge is formed by the row of abrasive tips. Alternatively, the abrasive means may have abrasive particles having a selective defined geometry, said abrasive particles having a flat shape with edges and coming to lie with a very high likelihood in the case of any scattering process in an orientation in which at least one edge is oriented parallel to a surface of the abrasive means backing and is inclined at an angle between 0° and 90° relative to the defined machining direction.

By means of the embodiment according to the invention of the abrasive means, an abrasive means that achieves a high surface quality of a workpiece to be machined as a result of a shearing cut characteristic can be achieved in particular.

It is also proposed for a least a large proportion of the abrasive particles to form at least one abrasive edge unit having an abrasive edge inclined at a defined angle between 0° and 90° relative to a defined machining direction. The term "at least a large proportion of the abrasive particles form at least one abrasive edge unit having an abrasive edge inclined at a defined angle between 0° and 90° relative to the defined machining direction" is to be understood to mean in particular that abrasive edges of abrasive edge units are arranged at an angle relative to the defined machining direction, which angle has been set purposefully by an application method. An application at a defined angle can be achieved for example in that the abrasive particles are applied to adhesive elements placed at certain points, which adhesive elements are formed for example as diagonally extending strips on the abrasive means backing, or for example by use of a cylinder device having a pattern of slot-like diagonal openings, wherein an abrasive particle quantity is arranged within the rolling device and is applied to the abrasive means backing in a strip pattern through the slot-like diagonal openings, such that the abrasive particles are then arranged on the abrasive means backing in the strip pattern. The application at the defined angle may also be achieved in that the abrasive particles comprise base bodies, advantageously square base bodies, by means of which the abrasive particles are placed onto the abrasive means backing, wherein the base bodies border one another. In particular, edges of the abrasive particles may be arranged in a plane parallel to a footprint of the base bodies, extending at an incline relative to the base body edges. By way of example, the abrasive particles may be produced using interconnected base bodies and may have been arranged as a complete unit on the abrasive means backing, wherein in principle an increase of a flexibility of the abrasive means may then have been effected in a process for separating the abrasive particles. Alternatively, the abrasive particles could have been captured on the base bodies individually and could have been purposefully placed on the abrasive means backing. In particular, a high machining quality can be achieved by a shearing cut characteristic.

Furthermore, it is proposed for the at least one abrasive edge unit to be formed by a row of at least substantially adjacently arranged abrasive particles. A "row of at least substantially adjacently arranged abrasive particles" is to be understood to mean in particular that the abrasive particles are arranged along a vector line extending in a plane parallel to the abrasive means backing, wherein an empty spacing between individual abrasive particles in the row corresponds at most to twice the diameter of a support face of an individual abrasive particle. An abrasive means having abrasive particles of which at least a large proportion form at least one abrasive edge unit having an abrasive edge inclined at an angle between 0° and 90° relative to a defined machining direction can be produced in particular by means of a simple process. In particular, abrasive particles having any geometries, in particular having a geometry with abrasive tips, can also be used.

Furthermore, it is proposed that the abrasive particles are to be purposefully placed. The term "purposefully placed" is to be understood to mean in particular that the abrasive particles have been applied in an application process in which they have been applied to the abrasive means backing substantially with a defined orientation and/or defined position. In particular, the abrasive particles may have been captured individually and purposefully placed. In particular, an abrasive means having a high abrasive capacity, purposefully set angle to the defined machining direction, and a high machining quality by means of a shearing cut characteristic can be achieved.

It is also proposed for the abrasive means backing to be formed as a cylindrical roller. Abrasive edge units that are applied to the abrasive means backing in the form of a cylindrical roller and that are formed by abrasive particles having an abrasive tip provided for material removal are preferred. The abrasive edges are preferably formed by rows of least substantially adjacently arranged abrasive particles. In particular, the rows of at least substantially adjacently arranged abrasive particles extend at an incline on a cylinder surface. In particular, the abrasive means is intended to be set in rotation about a cylinder axis, for an abrasive process. In particular, an abrasive means that can be produced by means of a simple process can be achieved.

Furthermore, it is proposed for the abrasive particles to have a surface contour that is described at least substantially by a convex envelope. A "surface contour that is described at least substantially by a convex envelope" is to be understood to mean in particular that a smallest envelope, which bears against the surface contour of the abrasive particles, is formed in a convex manner, and that concave notches in the surface, which lead to a deviation from a fully convex surface of the abrasive particles, have at most a depth of a maximum of two percent, advantageously a maximum of one percent, and preferably a maximum of half a percent of a maximum diameter of the abrasive particle. In particular, an abrasive particle having an advantageous cut characteristic can be achieved.

Furthermore, it is proposed for the abrasive particles to have a ratio between a height of the abrasive particles and a diameter of a base area, which ratio has a value between 0.3 and 1.2. A "diameter of the base area" is to be understood to mean in particular a diameter of the smallest circle by which the base area of the abrasive particles is fully surrounded. A "height of the abrasive particles" is to be understood to mean in particular a maximum distance between the base area and a plane parallel to the base area, in which plane a portion of the abrasive particle lies. In particular, on account of manufacturing tolerances, a value of the ratio between height and diameter of the base area of individual abrasive particles in a quantity of produced abrasive particles may deviate by a maximum of 10 percent from the value between 0.3 and 1.2. In particular, an abrasive particle having a particularly flat shape can be achieved, with which, in the case of irregular scattering, a high likelihood for an orientation of edges at an angle inclined between 0° and 90° relative to a defined machining direction can be achieved.

Furthermore, it is proposed for the abrasive particles to have a pyramidal basic shape at least substantially. A "pyramidal basic shape" is to be understood to mean in particular a shape having a polygonal base area and side faces with a triangular basic shape, which converge at least in a termination face, preferably in an abrasive tip. In particular, edges of the side face may be curved. In particular, a projection of the abrasive tip may be arranged in a plane in which the base area lies, in a center of the base area, within the base area, at an edge of the base area, or also outside the base area. In particular, the abrasive particles may be formed as tetrahedrons, pyramids with square basic shape, a truncated pyramid, or a truncated tetrahedron. In particular, an abrasive particle having a basic shape that can be applied and arranged easily can be achieved.

It is also proposed for the abrasive particles to comprise at least one partially prismatically formed sub-element. A "prismatically formed sub-element" is to be understood to mean in particular a sub-element of the abrasive particle that has a polyhedral basic area and side edges that are formed parallel to one another and are of equal length. In particular, the prismatically formed sub-elements may be formed for example as a cuboid, pentagon, or hexagon. The fact that the sub-element "is formed at least partially prismatically" is to be understood to mean in particular that individual side edges may deviate from a parallel course to other side edges and from an identical length. In particular, an abrasive particle having a basic shape that can be applied and arranged easily can be achieved.

Furthermore, it is proposed for the abrasive particles to have a hexagonal base area. In particular, the abrasive particles with the hexagonal base area have a prismatically formed sub-element, such that a basic shape of the abrasive particles has the shape of a bee honeycomb. In particular, an abrasive particle having a particularly flat shape can be achieved, with which, in the case of irregular scattering, a high likelihood for an orientation of edges at an angle inclined between 0° and 90° relative to a defined machining direction can be achieved.

Furthermore, it is proposed for the abrasive particles to have a square base area. In particular, abrasive particles that can be particularly easily arranged adjacently to one another and that can be purposefully placed can be achieved.

It is also proposed for the abrasive particles to have an oval base area. An "oval base area" is to be understood to mean in particular a base area that has a round convex shaping. In particular, the oval base area may be formed as an ellipsis or circle. In particular, the abrasive particle, in addition to the oval base area, has a surface parallel thereto, wherein edges for abrasion are arranged on the surface parallel thereto. In particular, an abrasive particle having a particularly flat shape can be achieved, with which, in the case of irregular scattering, a high likelihood for an orientation of edges having an angle inclined between 0° and 90° relative to a defined machining direction can be achieved.

It is also proposed for the abrasive particles to have at least one setback surface region, which is formed at least in part as a groove. In particular, the at least one groove is intended to serve as a predetermined breaking point for a controlled breaking of the abrasive particle and therefore to achieve a self-sharpening effect of the abrasive particle. In particular, an abrasive means having a largely uniform abrasive capacity during its entire service life can be achieved.

Furthermore, an abrasive particle for an abrasive means according to the invention is proposed.

Here, the abrasive means according to the invention is not to be limited to the above-described application and embodiment. In particular, the abrasive means according to the invention, in order to perform a function described herein, may have a number of individual elements, components and units deviating from a number specified herein.

The invention proceeds from a method for applying abrasive particles to an abrasive means backing. It is proposed for abrasive particles to be purposefully placed on the abrasive means backing.

The term "abrasive particles purposefully placed on the abrasive means backing" is to be understood to mean in particular that the abrasive particles are applied to the abrasive means backing using an application process in which the abrasive particles, once the application process is complete, are at least fixed and/or fastened to the abrasive means backing only at defined, individual places. In particular, in order to attain a selective placement of the abrasive particles in the method, fixing elements can be attached to the abrasive means backing at the defined, individual places, in particular fixing elements formed as a coating with an adhesive, such that abrasive particles scattered over an entire surface of the abrasive means backing are at least fixed only at the defined, individual places, and/or with which the abrasive particles are applied in at least one defined flow, which is directed to individual portions of the abrasive means backing and the other portions of the abrasive means backing are retained as regions free from abrasive particles. In particular, by purposefully placing the abrasive particles on the abrasive means backing, an abrasive means can be achieved that is oriented toward certain applications, for example by having a design adapted to a particularly formed workpiece surface. In particular, the "selective placement" is different from a scattering over an entire abrasive means backing covered completely with a layer formed of a base binder and from a subsequent fastening of the scattered abrasive particles on the abrasive means backing by application of at least one layer formed from a top binder to the entire abrasive means backing covered by abrasive particles. The fact that "abrasive particles are at least fixed" is to be understood to mean in particular that the abrasive particles are provided with a fixing to the abrasive means backing that is effective at least during a sub-method of a production method, wherein the fixing may have a lower adhesive force than a fastening of the abrasive particles to the abrasive means backing for a use of the abrasive means in an abrading operating mode. In principle, the fixing may also have a retaining force identical to the fastening of the abrasive particles to the abrasive means backing for the use of the abrasive means in the abrading operating mode. An "abrasive particle" is to be understood to mean in particular a preferably ceramic, crystalline and/or metal body having at least one abrasive edge. Depending on a desired application and a decided degree of fineness, the abrasive particles have a diameter between ten millimeters and half a micrometer. In particular, the abrasive particle may have a defined geometry. The term "abrasive particles having a defined geometry" is to be understood to mean in particular abrasive particles that at least substantially have an identical and predetermined shape, for example a rod shape or tetrahedral shape. In particular, abrasive particles having a defined geometry have been produced by a process that purposefully produces abrasive particles having the at least substantially predetermined shape. An "at least substantially identical shape" is to be understood to mean in particular that the abrasive particles have an identical shape and preferably an identical size apart from deviations caused by the production process. An "abrasive means backing" is to be understood to mean in particular a rigid backing, such as a ceramic sheet, or preferably a flexible backing, such as a velour sheet, paper, film, or a fabric, to which the abrasive particles are applied and fastened and which is preferably intended to be fastened to an abrasive machine. An "abrasive means" is to be understood to mean in particular a body having at least one abrasive means backing and at least one layer of abrasive particles fastened on the abrasive means backing, which body is intended to remove material from a surface of a workpiece in an abrading operating mode by means of abrasive edges and/or abrasive tips of the abrasive particles. Due to the embodiment according to the invention of the method, a purposeful adaptation of a design of the abrasive means to specific workpieces to be abraded can be achieved in particular.

Furthermore, it is proposed for the abrasive particles to be purposefully placed in abrasive particle groups arranged at a predefined distance from one another. The term "purposefully placed in abrasive particle groups" is to be understood to mean in particular that the abrasive particles, following application in individual regions, in each of which at least one abrasive particle and preferably a plurality of abrasive particles are arranged and which are separated by regions free from abrasive particles, are arranged on the abrasive means backing. Within an abrasive particle group, the abrasive particles may be arranged at irregular distances from one another. A selective placement in abrasive particle groups can be achieved for example in that the abrasive particles are applied to an abrasive means backing having individual retaining elements for holding abrasive particles, such that abrasive particle groups are held only at the retaining elements and the abrasive particles resting on other regions of the abrasive means backing are separated or the abrasive particles are applied to the abrasive means backing in an application method by means of individual application flows. An abrasive means having specially selected particle arrangements can be achieved in particular.

In accordance with a development of the invention it is proposed for the abrasive particles to be applied to adhesive elements applied at certain points to the abrasive means backing. The term "adhesive elements applied at certain points to the abrasive means backing" is to be understood to mean in particular adhesive elements that are applied to the abrasive means backing in individual regions of a surface of the abrasive means separated from one another by surface regions free from adhesive. In particular, the adhesive elements applied at certain points to the abrasive means backing are intended at least for a fixing of abrasive particles on the abrasive means backing. In particular, the adhesive elements applied at certain points to the abrasive means backing are of a size such that at least one individual abrasive particle and preferably a plurality of abrasive particles can be scattered on a surface of the adhesive element applied at certain points to the abrasive means backing. In principle, an adhesive of the adhesive elements may be present in an at least partially liquid state, in which it is adhesive, or in a solid state, in which it is transferred into an adhesive state for example by the influence of heat and/or addition of a further substance. A purposeful placement of abrasive particles, in particular a purposeful placement in abrasive particle groups, can be achieved in particular in a manner that can be carried out in a technically simple way.

Furthermore, it is proposed for the adhesive elements applied at certain points to have at least one indentation for receiving the abrasive particles. The indentation is preferably formed in the adhesive elements applied at certain points, the adhesive of said adhesive elements being applied in a partially liquid, adhesive state. In particular, as a result of the effect of the force of gravity on abrasive particles that have been scattered onto the adhesive element applied at certain points, a force is exerted, by means of which the abrasive particles are moved along side regions of the adhesive element applied at certain points, toward a center point of the indentation. As a result of a movement of the abrasive particle toward a center point of the indentation, the abrasive particle is advantageously oriented such that at least one abrasive edge and/or an abrasive tip of the abrasive particle is directed away from the abrasive means backing. By way of example, the indentation is produced by a jet of air that is directed to a center point of an adhesive element applied at certain points. An additional, advantageous orientation of the abrasive particles can be achieved in particular.

Furthermore, it is proposed for the abrasive particles to be oriented toward the adhesive elements applied at certain points by a surface tension produced by means of heating. In particular, an adhesive of the adhesive elements is transferred by the heating from a solid state into a liquid, adhesive state. In particular, the abrasive particle is oriented in that different portions of the adhesive element applied at certain points, which portions are arranged on different sides of the abrasive particles, are transferred at different moments from the solid state into the liquid state, such that there is a difference of surface tensions, by means of which the abrasive particles are oriented. The abrasive particle advantageously has an at least partially elongate design. An "at least partially elongate design of the abrasive particle" is to be understood to mean in particular a design of the abrasive particle with which a maximum extension in a longitudinal direction is at least twice as great, advantageously at least four times as great, and advantageously at least six times as great as a maximum extension in a direction perpendicular to the longitudinal direction. An orientation by means of a heating of the adhesive elements is known as the 'tombstone effect', for example in the processing of SMD components in electronics. An orientation of the purposefully applied abrasive particles in order to attain a high abrasive capacity of the abrasive particles can be achieved in particular by means of a simple method.

It is also proposed for the abrasive particles to be applied to the abrasive means backing at least substantially in the form of a spiral. The term "at least substantially in the form of a spiral" is to be understood to mean in particular that the abrasive particles are applied in a form that has at least one spiral arm or is designed as a portion of a spiral arm.

The abrasive particles are advantageously applied to the abrasive means backing completely in the form of a one-armed or multi-armed spiral. In particular, by means of an application of the abrasive particles substantially in the form of a spiral, an advantageous arrangement of the abrasive particles is achieved, with which individual abrasive particles are arranged substantially free from overlap, such that a maximum abrasive capacity can be achieved. By way of example, the abrasive particles may be arranged in the form of a spiral stretching along a rolled abrasive means backing. In particular, a shape of purposefully placed abrasive particles on the abrasive means backing with a high abrasive capacity can be achieved, in particular with use of the abrasive means as attachment of a rotary abrasive device, which sets the abrasive means in rotation.

In a development of the invention it is proposed for the abrasive particles to be applied substantially in the form of a Fibonacci spiral. A "Fibonacci spiral" is to be understood to mean in particular a spiral shape with a course through corner points of adjacently arranged squares arranged in succession in an anticlockwise or clockwise direction, wherein the side lengths of the squares arranged in succession in an anticlockwise or clockwise direction are provided in a ratio to one another that is predefined by a Fibonacci sequence, wherein an orientation of the corner points of successive squares through which the spiral shape extends also changes in an anticlockwise or clockwise direction. In particular, the Fibonacci spiral comprises a plurality of spiral arms. In particular, the abrasive particles are arranged, by application in the shape of a Fibonacci spiral, in a shape in which a shadowing is avoided, in which case abrasive particles or abrasive particle groups arranged in a machining direction in front of other abrasive particles or abrasive particle groups cause a reduction of an abrasive capacity of the other abrasive particles or abrasive particle groups. In particular, by means of the application of the abrasive particles in the shape of a Fibonacci spiral, a shadowing of abrasive particles or abrasive particle groups is avoided, both in the event of a purely rotary movement of the abrasive means in an abrading process and with use of the abrasive means in belt sanding or random orbit sanding. An abrasive means in which the abrasive particles are arranged with a particularly high abrasive capacity can be achieved in particular.

Furthermore, the abrasive particles can be purposefully placed in an arrangement that is intended for a purposeful generation of an airflow in an abrading operating mode. In particular, the airflow is intended, in an abrading operating mode, to remove abrasive dust, chips or abrading and/or coolant liquids and in particular to convey these to a suction hole. A reduction of an abrasive capacity caused by abrasive dust and/or abrading residue collecting in the abrasive means is thus avoided and/or reduced in particular. Further, an interruption of an abrading operating mode for a removal of abrasive dust from the abrasive means can be avoided. An abrasive means that in an abrading operating mode achieves a high service life with a high abrasive capacity can be achieved in particular.

Furthermore, it is proposed that in a scattering process free regions are obtained purposefully on the abrasive means backing by means of a part-retention device. A "part-retention device" is to be understood to mean in particular a device that has catch surfaces for retaining abrasive particles in a scattering process and also through-openings, which are intended to allow abrasive particles in the scattering process to pass through. The term "free regions on the abrasive means backing" is to be understood to mean in particular regions that are formed free from abrasive particles. In particular, the part-retention device is intended to be used in an electrostatic scattering method for applying abrasive particles to the abrasive means backing. An "electrostatic scattering method" is to be understood to mean in particular a scattering method in which electrically polarizable abrasive particles are applied to an abrasive means backing by an electric field against gravity. A purposeful placement of the abrasive particles can be achieved in particular in a technically simple manner.

It is also proposed for the abrasive particles to be purposefully placed on an abrasive means backing by means of a shaft loading device. A "shaft loading device" is to be understood to mean in particular a transport device that moves the abrasive particles in an undulating transport flow, which is guided in at least one transport shaft unit, partially against the force of gravity, wherein the abrasive particles contact the abrasive means backing at a point of reversal of the transport flow and are applied to the abrasive means backing. In particular, the abrasive particles are moved by means of a transport flow formed of air. In particular, the shaft loading device comprises at least one first transport shaft unit, which generates a transport flow with abrasive particles. In particular, the device for producing the abrasive means may have at least one second transport shaft unit. A technically simple purposeful application of abrasive particles to the abrasive means backing can be achieved in particular.

Furthermore, it is proposed for the abrasive particles to be coated on a support face with adhesive prior to a transport in the shaft loading device. A "support face" is to be understood to mean in particular a surface of the abrasive particles that is intended to serve as a contact face to the abrasive means backing and that faces away from an abrasive edge and/or an abrasive tip of the abrasive particle. In particular, the abrasive means backing is formed free from adhesive, such that only abrasive particles contacting in a correct orientation can be applied and fastened to the abrasive means backing. An advantageous orientation of the abrasive particles can be achieved in particular.

Furthermore, a device for producing an abrasive means according to the invention is proposed.

Furthermore, an abrasive means produced by means of a method according to the invention is proposed.

The method according to the invention is not to be limited here to the above-described application and embodiment. In particular, the method according to the invention, in order to perform a function described herein, may have a number of individual method steps deviating from a number specified herein. A device for carrying out the method according to the invention may also have a number of individual elements, components and units deviating from the number specified herein.

The invention proceeds from a method for producing an abrasive means, in which abrasive particles are scattered onto at least one abrasive means backing. It is proposed for the abrasive particles to be scattered at least partially oriented by at least one orientation aid.

An "abrasive means" is to be understood to mean in particular a means having at least one layer formed from abrasive particles, which means is intended in an abrasive process to machine a surface and to attain a material removal on the surface. In particular, the abrasive means comprises at least one abrasive means backing and at least one layer formed from abrasive particles, which is fastened on the abrasive means backing by means of at least one fastening means, in particular at least one fastening layer formed from an adhesive, for example a resin. The layer formed from abrasive particles is preferably fixed loosely to a surface of the abrasive means backing by means of at least one layer formed from a base binder and is fastened fixedly by means of at least one layer formed from a top binder. An "abrasive means backing" is to be understood to mean in particular a body formed from a carrier material, for example a strip or a disk formed from a paper material, a paperboard material, a textile material, in particular a velour material, a film, a foam, a plastic and/or a metal. In particular, the abrasive means backing may have a plurality of layers formed from the same or from different carrier materials. The abrasive means backing is preferably strip-shaped or disk-shaped. However, other forms, for example forms like the frustum of a cone or hexagonal forms, are also possible in principle. An "abrasive particle" is to be understood to mean in particular a preferably ceramic, crystalline and/or metal body having at least one working tip, at which abrasive edges for removing material of a workpiece to be machined converge. Depending on a desired application and a desired degree of fineness, the abrasive particles have a diameter between a maximum of ten millimeters, preferably a maximum of one millimeter, and a minimum of half a micrometer, advantageously a maximum of five micrometers. The abrasive particle is preferably produced in a production process comprising at least one method step of a sintering or is sintered for hardening following an application to the abrasive means. A layer of abrasive particles may comprise, in principle, abrasive particles having a defined geometry and/or abrasive particles having an undefined geometry.

The term "abrasive particles having a defined geometry" is to be understood to mean in particular abrasive particles that at least substantially have an identical and at least substantially predetermined shape, for example a rod shape or tetrahedral shape. In particular, abrasive particles having a defined geometry have been produced by a process that purposefully produces abrasive particles having the at least substantially predetermined shape. An "at least substantially identical shape" is to be understood to mean in particular that the abrasive particles have an identical shape and preferably an identical size apart from deviations caused by the production process. The term "orientation aid" is to be understood to mean in particular a means by way of which a likelihood of an application of abrasive particles in a predefined orientation, in which a high abrasive capacity is achieved, to the abrasive means backing can be increased. In particular, the orientation aid orients the abrasive particles before and/or in a scattering step at least partially identically in a predefined orientation, such that the partially identically oriented abrasive particles are all applied with an identical orientation. In particular, abrasive particles having a form with low symmetry are oriented by the orientation aid, such that the abrasive particles have a different abrasive capacity depending on an orientation. In particular, abrasive particles that have a shape different from a pyramidal shape or tetrahedral shape are oriented by the orientation aid. The term "scattered at least partially oriented" is to be understood to mean in particular that, after the scattering process, at least seventy percent, advantageously at least eighty percent, and preferably at least ninety percent of the abrasive particles rest on the abrasive means backing in an orientation in which they provide a high abrasive capacity. In particular, a proportion of the abrasive particles that arrives in an orientation in which an abrasive tip or abrasive edge is directed toward the abrasive means backing is reduced. Due to the embodiment of the method according to the invention, an abrasive means having a high abrasive capacity and/or having an improved machining behavior describing a surface quality produced by the abrasive means can be produced in particular.

Furthermore, it is proposed for the abrasive particles to be oriented at least partially in a predefined scattering orientation by the at least one orientation aid prior to a scattering step. A "scattering step" is to be understood to mean in particular a method step in which abrasive particles are applied to the abrasive means backing along a free path, wherein the abrasive particles either partially fall along an active direction of the force of gravity onto the abrasive means backing or are moved partially against an active direction of the force of gravity toward the abrasive means backing. By way of example, in a scattering step, in which the abrasive particles are moved along a free path partially against the active direction of the force of gravity, the abrasive particles are moved by means of negative pressure or an electric field against the active direction of the force of gravity. The abrasive particles are preferably moved by means of the electric field against the active direction of the force of gravity, wherein such a scattering step is referred to as "electrostatic scattering". A "predefined scattering orientation" is to be understood to mean in particular an orientation of the abrasive particles with which, once the scattering step has been performed, the abrasive particles rest on the abrasive means backing in an orientation in which they provide a maximum abrasive capacity. In particular, the scattering step is designed such that abrasive particles that have an identical orientation to one another at the start of the scattering step also have an identical orientation to one another once the scattering step is complete. An abrasive means having a high abrasive capacity can be achieved in particular.

Furthermore, it is proposed for the abrasive particles to be oriented at least partially by at least one orientation aid formed as a vibration unit. A "vibration unit" is to be understood to mean in particular a unit that introduces force pulses onto a surface on which the abrasive particles rest in order to orient the abrasive particles on the surface. In particular, the vibration unit causes a shaking movement of the abrasive particles. An at least partial orientation of the abrasive particles can be achieved in particular with a low technical outlay.

In a development of the invention it is proposed for the abrasive particles to be at least partially oriented by at least one vibration device formed at least partially integrally with a transport belt unit. A "transport belt unit" is to be understood to mean in particular a unit that comprises at least one conveyor belt, on which the abrasive particles rest, and via which these are transported to a location of a scattering. A reduced equipment outlay can be achieved in particular.

It is also proposed for the abrasive particles to be oriented at least partially in a scattering step by at least one orientation aid formed as an airflow unit. An "airflow unit" is to be understood to mean in particular a unit that is intended to purposefully generate an airflow in order to move abrasive particles during the scattering step into an intended application orientation by means of the airflow. An at least partial orientation of the abrasive particles can be achieved in particular with a low technical outlay.

Furthermore, it is proposed for the abrasive particles to be at least partially oriented in a scattering step through at least one orientation aid comprising screen openings. The term "screen openings" is to be understood to mean in particular openings in a body of the orientation aid that have a specially selected size and a specially selected shape, such that a passage of the abrasive particles through the screen openings in at least one specific orientation, which preferably deviates from an application orientation, is blocked and a passage of the abrasive particles in at least one further specific orientation, which preferably corresponds to an application orientation, is enabled. In particular, an application of the abrasive particles in an orientation with a low abrasive capacity is thus prevented by the screen openings. The orientation aid comprising screen openings is preferably arranged at a short distance from the abrasive means backing, such that the abrasive particles passing through the screen openings are applied to the abrasive means backing in the orientation with which they pass through the screen openings. Screens for generating a uniform scatter pattern when scattering abrasive particles are already known, however they do not provide any orientation of the abrasive particles in the scattering process. An at least partial orientation of the abrasive particles can be achieved in particular with a low technical outlay.

It is also proposed for a passage of abrasive particles through the screen openings to at least be assisted by a screening aid unit. A "screening aid unit" is to be understood to mean in particular a unit that brings the abrasive particles resting or contacted on the orientation aid in an orientation with which they are blocked by the screen openings into an orientation in which they can fall through the screen openings. The screening aid unit is preferably formed as a vibration unit. In particular, a high efficiency of the at least partially directed application can be achieved.

Furthermore, a device for carrying out the method according to the invention is proposed.

Furthermore, it is proposed for the device to comprise a vibration unit. In particular, the vibration unit forms at least a sub-unit of the orientation aid.

In a development of the invention it is proposed for the vibration unit to be formed at least partially integrally with the transport belt unit. The term "formed at least partially integrally with the transport belt unit" is to be understood to mean in particular that at least a portion of the transport belt unit is designed to generate force pulses that act on transported abrasive particles. In particular, a reduced equipment outlay can be achieved.

The method according to the invention is not to be limited here to the above-described application and embodiment. In particular, the method according to the invention, in order to perform a function described herein, may have a number of individual method steps deviating from a number specified herein. A device for carrying out the method according to the invention may also have a number of individual elements, components and units deviating from a number specified herein.

The invention proceeds from a device for applying abrasive particles to an abrasive means backing.

At least one abrasive particle feed cylinder is proposed, which on its lateral face has recesses for receiving in each case at least one abrasive particle and which is intended to apply the abrasive particles to the abrasive means backing at least substantially in a defined arrangement. An "abrasive particle" is to be understood in this context to mean in particular a particulate body that is intended for the chip-removing machining of a workpiece by means of a chip edge. The abrasive particles preferably have a particle size of less than 3 mm, particularly preferably less than 2 mm. A "particle size" is to be understood in this context to mean an equivalent diameter of the abrasive particles determined by screening. The abrasive particles may be formed preferably at least predominantly by a ceramic material, and in particular the abrasive particles may contain or consist of a polycrystalline ceramic material. The abrasive particles preferably contain aluminum oxide, particularly preferably $\alpha$-$Al_2O_3$. An "abrasive means backing" is to be understood in this context to mean in particular a preferably flexible carrier material of an abrasive means. The abrasive means backing in particular may comprise binders and/or paper and/or textile material. Further possible carrier materials are known to a person skilled in the art. The abrasive means is preferably formed predominantly by the abrasive means backing and the abrasive particles. In particular, an abrasive means formed as an abrasive paper and/or abrasive cloths may be formed predominantly by an abrasive means backing which is formed by a paper and/or a fabric and/or a film with a binder and to which a plurality of abrasive particles adhere. A "defined arrangement" is to be understood in this context to mean in particular an arrangement in a regular pattern, such as an arrangement of the abrasive particles in regular and/or offset columns and/or rows. A person skilled in the art will define a suitable arrangement depending on abrasive particle properties and/or machining task, in which arrangement the abrasive particles are applied to the abrasive means backing. The term "at least substantially" is to be understood in this context to mean in particular that a deviation of an actual position from a target position of the applied abrasive particles on the abrasive means backing is less than 40%, preferably less than 20%, particularly preferably less than 15%, in relation to an average distance between adjacent abrasive particles applied to the abrasive means backing.

Due to the embodiment according to the invention of the device for applying abrasive particles, abrasive particles can be applied particularly efficiently to the abrasive means backing in a defined arrangement. A particularly large number of abrasive particles can be applied during a unit of time and/or abrasive particles can be applied in a defined arrangement to a particularly large area of the abrasive means backing during a unit of time.

It is also proposed for the recesses to be designed to each receive an individual abrasive particle. The abrasive particles may be dispensed onto the abrasive means backing individually, in an arrangement corresponding to an arrangement of the recesses on the lateral face of the abrasive particle feed cylinder. The abrasive particles may be arranged particularly precisely. A quantity of abrasive particles that is arranged can be determined particularly precisely.

In a particularly advantageous embodiment of the invention the recesses have a shape complementary to a geometry of the abrasive particles. In particular, the recesses may be intended to receive abrasive particles having a defined abrasive particle geometry. A "defined abrasive particle geometry" is to be understood in this context to mean in particular that the abrasive particles, at least within manufacturing tolerances, have a defined target geometry, such as a conical shape, a pyramidal shape, a prismatic shape or a tetrahedral shape. Further advantageous abrasive particle geometries are known to a person skilled in the art. The abrasive particles can be produced advantageously in a forming method, in particular in a slip casting method, an extrusion method, a powder pressing method or a further manufacturing method known to a person skilled in the art. In particular, the abrasive particles with the defined abrasive particle geometry may have defined chip edges, which in particular with a defined orientation of the abrasive particles on the abrasive means backing have an advantageously high removal capacity. In this context a "complementary shape" is to be understood in particular to mean a shape of a recess of which the inner contour is suitable for receiving an outer contour of the abrasive particle in a defined orientation. The recess preferably has an inner contour, which, enlarged by an oversize, corresponds to the target geometry of the outer contour of the abrasive particles, in particular a conical shape, a pyramidal shape, a prismatic shape or a tetrahedral shape. A person skilled in the art will define the oversize such that the recesses for receiving the abrasive particles can receive these in an advantageous orientation without wedging. By way of example, a person skilled in the art may define a volume of the recesses for a specific abrasive particle geometry such that said volume is preferably more than 110%, particularly preferably more than 120%, and preferably less than 150%, particularly preferably less than 125%, in relation to a volume of the abrasive particles. Incorrectly oriented abrasive particles are preferably not received by the recesses. The abrasive particle feed cylinder may apply the abrasive particles to the abrasive means backing advantageously in a defined arrangement. In particular, the recesses may additionally have a coating on recess surfaces, which coating avoids a wedging of the particles, for example an anti-adhesion coating. An abrasive means can be produced particularly efficiently with the device for applying abrasive particles.

Furthermore, an abrasive particle storage container is proposed, which is arranged above the abrasive particle feed cylinder with respect to the direction of the force of gravity and which has at least one opening for heaping abrasive particles onto at least one portion of the lateral face of the abrasive particle feed cylinder. The portion preferably extends at least over an entire width of the abrasive particle feed cylinder comprising the recesses. A "width of the abrasive particle feed cylinder" is to be understood to mean in particular a longitudinal extension of the abrasive particle feed cylinder in a direction perpendicular to a periphery of the abrasive particle feed cylinder. The portion preferably extends along a periphery of the abrasive particle feed cylinder along a plurality of recesses, preferably more than five recesses, particularly preferably more than ten recesses. The opening preferably ends with a gap from the lateral face of the abrasive particle feed cylinder, which gap is at least narrower than an average abrasive particle diameter and/or an average abrasive particle thickness. An exit of abrasive particles from the gap can be avoided. The abrasive particles may advantageously be dispensed from the abrasive particle storage container into the recesses of the abrasive particle feed cylinder.

Furthermore, at least one stripping element is proposed, which is intended to strip off abrasive particles resting on the lateral face outside the recesses. The stripping element preferably covers at least the gap between the lateral face and the abrasive particle storage container. The stripping element is preferably formed at least in part from a flexible material. The stripping element may have a rubber lip and/or in particular a brush. Abrasive particles located outside the recesses can be retained advantageously in the abrasive particle storage container and/or on a surface of the abrasive particle feed cylinder. In particular, it is possible to prevent abrasive particles resting outside the recesses from being applied to an abrasive means backing.

Furthermore, at least one retaining unit is proposed, which is intended to cover a portion of a lateral cylinder face from an abrasive particle take-over region to an abrasive particle dispensing region. A "lateral cylinder face" is to be understood in this context to mean in particular a face that the abrasive particles sweep over into the recesses of the abrasive particle feed cylinder during the transport process in a rolling direction of the abrasive particle feed cylinder. The lateral cylinder face is an envelope of the portion of the lateral face of the abrasive particle feed cylinder intended to transport abrasive particles from the abrasive particle take-over region to the abrasive particle dispensing region. And "abrasive particle transfer region" is to be understood in this context to mean in particular a region of the lateral face of the abrasive particle feed cylinder in which the abrasive particles are received by the recesses of the abrasive particle feed cylinder. An "abrasive particle dispensing region" is to be understood in this context to mean in particular a region of the lateral face of the abrasive particle feed cylinder in which the abrasive particles are dispensed from the recesses of the abrasive particle feed cylinder. The retaining unit in particular may have a cylinder inner face covering the lateral cylinder face. A gap remaining between the lateral cylinder face and the retaining unit may preferably be smaller than half the mean abrasive particle diameter or abrasive particles thickness, particularly preferably smaller than a quarter of a mean abrasive particle diameter or an abrasive particle thickness. A person skilled in the art thus defines a size of the gap between the lateral cylinder face and the retaining unit such that abrasive particles received in the recesses of the abrasive particle feed cylinder are held in the recesses during transport. In particular, the at least one retaining unit may be formed integrally with the at least one stripping element. Abrasive particles can advantageously be prevented from being dispensed before the abrasive particle dispensing region. The abrasive particles can be dispensed particularly well in a defined arrangement and/or orientation.

The device advantageously has a vibration device, which is intended to set the abrasive particle feed cylinder in vibration in order to assist a receiving and/or dispensing of the abrasive particles. The abrasive particles may be received particularly well in recesses of a vibrating abrasive particle feed cylinder. The abrasive particles may be dispensed particularly well from recesses of a vibrating abrasive particle feed cylinder. A wedging of the abrasive particles can be avoided.

In an alternative embodiment of the invention it is proposed for the recesses to be connected to an overpressure source at least in a portion of the lateral cylinder face in at least one operating state, said overpressure source being intended to dispense the abrasive particles from the recesses by application of an overpressure. The recesses, in particular in their base, may preferably have openings that are connected to the overpressure source when the recesses sweep over the abrasive particle dispensing region. An "overpressure source" is to be understood in this context to mean in particular a pressure source that provides a pressure higher than an ambient pressure of the surroundings of the abrasive particle feed cylinder. The abrasive particles can be dispensed advantageously from the recesses onto the abrasive means backing by the overpressure. Abrasive particles can be prevented from remaining in the recesses and/or from being dispensed too late.

At least in a portion of the lateral cylinder face, the recesses are preferably connected in at least one operating state to a negative pressure source, which is intended to fix the abrasive particles in the recesses by application of a negative pressure. The openings at the base of the recesses may preferably be connected to the negative pressure source when the recesses sweep over the lateral cylinder face from the abrasive particle receiving region to the abrasive particle dispensing region. A "negative pressure source" in this context is to be understood to mean in particular a pressure source that provides a pressure that is lower than the ambient pressure of the surroundings of the abrasive particle feed cylinder. The abrasive particles may advantageously be held in the recesses. A retaining unit that retains the abrasive particles can be omitted. The receiving of the abrasive particles in the recesses can be assisted.

A method is also proposed for producing an abrasive means, in which the abrasive particles are applied to the abrasive means backing by means of the device according to the invention. In particular, the abrasive means backing, before the abrasive particles are applied by means of the device according to the invention, has a layer formed from a binder in order to fasten the applied abrasive particles. In particular, the produced abrasive means may have abrasive particles in a defined arrangement. The abrasive means can be produced particularly efficiently.

An abrasive means having a plurality of abrasive particles applied by means of the device according to the invention is also proposed. The abrasive means may have a particularly advantageous abrasive particle arrangement, which enables a high removal capacity and/or a high surface quality of a machined workpiece.

Here, the device according to the invention is not to be limited to the above-described application and embodiments. In particular, in order to perform a function described herein, the device according to the invention may have a number of individual elements, components and units deviating from a number specified herein.

The invention proceeds from a method for producing an abrasive means, comprising at least one heaping step, in which abrasive particles are heaped onto an abrasive means backing. It is proposed for the abrasive particles to be oriented by means of an electromagnetic field during and/or following the at least one heaping step.

An "abrasive means" is to be understood to mean in particular a means having at least one layer formed from abrasive particles, which is intended to machine a surface in an abrading process and to obtain a material removal on the surface. In particular, the abrasive means comprises at least one abrasive means backing and at least one layer formed of abrasive particles applied to the at least one abrasive means backing, which layer is fastened to the abrasive means backing by means of at least one fastening means, in particular at least one fastening layer formed from an adhesive. The layer formed from abrasive particles is preferably fixed loosely to a surface of the abrasive means backing by means of at least one layer formed from a base binder and is fixedly fastened by means of at least one layer formed from a top binder. An "abrasive means backing" is to be understood to mean in particular a body formed from a carrier material, for example a strip or a disk formed from a paper material, a paperboard material, a textile material, in particular a velour material, a film, a foam, a plastic and/or a metal. In particular, the abrasive means backing may have a plurality of layers formed from the same or from different carrier materials. The abrasive means backing is preferably strip-shaped or disk-shaped, however other forms, for example forms like the frustum of a cone or hexagonal forms are also possible in principle. An "abrasive particle" is to be understood to mean in particular a preferably ceramic, crystalline and/or metal body having at least one working tip, at which abrasive edges for removing material of a workpiece to be machined converge. A ceramic abrasive particle may be produced for example partially or wholly from aluminum oxide, zirconium oxide, silicon nitride, silicon carbide or another ceramic material. Depending on a desired application and a desired degree of fineness, the abrasive particles have a diameter between a maximum of ten millimeters, preferably one millimeter, and a minimum of twenty micrometers, advantageously a maximum of five micrometers and preferably half a micrometer. The abrasive particle is preferably produced in a production process comprising at least one method step of a sintering or is sintered for hardening following an application to the abrasive means backing. A layer of abrasive particles may comprise, in principle, abrasive particles having a defined geometry and/or abrasive particles having an undefined geometry. The term "abrasive particles having a defined geometry" is to be understood to mean in particular abrasive particles that at least substantially have an identical and at least substantially predetermined shape, for example a rod shape or tetrahedral shape. In particular, abrasive particles having a defined geometry have been produced by a process that purposefully produces abrasive particles having the at least substantially predetermined shape. An "at least substantially identical shape" is to be understood to mean in particular that the abrasive particles have an identical shape and preferably an identical size apart from deviations caused by the production process. In particular, the abrasive particle, on account of a material and a design and/or an at least partial coating, has an electric or magnetic dipole moment, such that it can be oriented by an electromagnetic field. A "heaping step" is to be understood to mean in particular a method step in which abrasive particles are applied to the abrasive means backing in a pouring process. In particular, a method for producing an abrasive means having a high abrasive efficiency by an advantageous orientation of the abrasive particles can be achieved in particular with a low technical outlay.

It is also proposed for the method to comprise at least one method step for producing an abrasive article, in which abrasive particle intermediate products are provided at least in part with an electromagnetically effective coating. An "abrasive particle intermediate product" is to be understood to mean in particular an intermediate product of a production of an abrasive particle that passes through at least one further method step, for example a sintering step or an application of a coating, before it is applied as a finished abrasive particle. An "electromagnetically effective coating" is to be understood to mean in particular a coating that comprises a material having an electric and/or magnetic moment, in particular a ferroelectric, paramagnetic, ferromagnetic or ferromagnetic material. In particular, the electromagnetically effective coating allows the abrasive particle to be attracted by a magnet. The term "at least partially provided with an electromagnetically effective coating" is to be understood to mean in particular that the electromagnetically effective coating is applied merely to a portion of a surface of the abrasive particle, for example to a surface of a support side of the abrasive particle, and that other portions of the surface of the abrasive particle, for example on a surface of an abrasive side of the abrasive particle, are free from the electromagnetically effective coating. In particular, an abrasive particle can be easily oriented by electromagnetic fields and a saving of an electromagnetically effective coating material can be achieved.

It is also proposed for the abrasive particles to be at least fixed to the abrasive means backing by means of magnets. In particular, the magnets for fixing the abrasive particle are introduced into the abrasive means backing or are arranged on an additional unit arranged substantially in a stationary manner relative to the abrasive means backing in at least one method step. The term "at least fix" is to be understood to mean in particular that the abrasive particles are attracted by the magnets and are held on the abrasive means backing by the force the attraction of the magnets, wherein the abrasive particles are fastened to the abrasive means backing by means of a lower retaining force than in the case of a fastening by means of a binder layer formed from a conventional base binder and/or top binder, however the abrasive particles are secured against a detachment from the abrasive means backing caused by the force of gravity, for example by a movement of the abrasive means backing into a position in which the abrasive means backing is arranged above the abrasive particles, as considered from a ground surface. In particular, a fixing of oriented abrasive particles can be achieved, wherein the magnets particularly advantageously orientate the abrasive particles.

Furthermore, it is proposed for the abrasive particles to be at least fixed to the abrasive means backing by means of magnets arranged on a carrier unit. In particular, the carrier unit is different from the abrasive means backing. In particular, the carrier unit is arranged at least substantially in a stationary manner relative to the abrasive means backing in at least one method step. The term "arranged substantially in a stationary manner relative to the abrasive means backing in at least one method step" is to be understood to mean in particular that magnets arranged on the carrier unit are each arranged in the method step at a constant distance from a specific location on the abrasive means backing and in particular track movements of the abrasive means backing in such a way that the constant distances are maintained. In particular, a conventional abrasive means backing without specially introduced magnets can be used in the method according to the invention.

It is also proposed for the magnets on the abrasive means backing to produce discrete abrasive points from at least fixed abrasive particles. In particular, the at least fixed abrasive particles are already oriented by the magnets. The term "discrete abrasive points" is to be understood in particular to mean locations on the abrasive means backing at which at least one abrasive particle, preferably a number of abrasive particles, is fixed by means of a magnet, wherein, at most, unfixed abrasive particles are arranged between the location and a further discrete abrasive point. In particular, the magnets are distributed in such a way that there is a distance on the abrasive means backing between individual abrasive points, which distance is occupied by unfixed abrasive particles or is at least partially free from abrasive particles, having a diameter corresponding at least substantially to the discrete abrasive points. In particular, an advantageous arrangement of the abrasive particles on the abrasive means backing can be provided by the discrete abrasive points, for example an arrangement with alternating abrasive particle surface densities for special applications. In principle, the magnets may also be arranged, however, such that a continuous layer formed from fixed abrasive particles covers an entire surface of the abrasive means backing. In particular, an abrasive means adapted to particular requirements can be achieved by purposeful arrangement of the magnets in the method.

Furthermore, it is proposed for unfixed abrasive particles to be removed from the abrasive means backing in a separation step. The term "unfixed abrasive particles" is to be understood to mean in particular abrasive particles scattered on the abrasive means backing, which abrasive particles experience a low retaining force or no retaining force by the magnets and can therefore be removed from the abrasive means backing by the effect of the force of gravity, for example by rotating the abrasive means backing, such that the abrasive particles are facing toward the ground surface. The separation step may be configured in particular as a suction method for suctioning unfixed abrasive particles, a blowing method for removing unfixed abrasive particles by means of an airflow, or a separation method based on the force of gravity. In particular, an abrasive means in which a high number of abrasive particles are arranged on the abrasive means backing in an oriented manner, such that a high abrasive capacity is achieved by optimal arrangement of abrasive sides of the abrasive particles relative to a surface to be machined, can be achieved by the method according to the invention.

In a development of the invention it is proposed for the unfixed abrasive particles to be separated by means of a separation method based on the force of gravity. A "separation method based on the force of gravity" is to be understood to mean in particular that the unfixed abrasive particles are separated from the fixed abrasive particles by the force of gravity, in particular by a method in which the abrasive means backing is tilted, rotated or deflected, such that the abrasive particles on the abrasive means backing experience a force component directed away from the abrasive means backing as a result of the force of gravity. In particular, the force component directed away from the abrasive means backing is smaller than a retaining force exerted by the magnets onto fixed abrasive particles. In particular, by means of the method according to the invention, an abrasive means can be achieved in which a high number of abrasive particles is arranged on the abrasive means backing in an oriented manner, such that a high abrasive capacity is achieved by optimal arrangement of abrasive sides of the abrasive particles relative to a surface to be machined.

It is also proposed for the abrasive particles to be oriented at least partially along a falling path by the electromagnetic field. A "falling path" is to be understood to mean in particular a path between a mouth of a pouring device, by means of which the abrasive particles are heaped onto the abrasive means backing, and the abrasive means backing. The fact that "the abrasive particles are at least partially oriented along the falling path by the electromagnetic field" is to be understood to mean in particular that the electromagnetic field acts on the abrasive particles in order to at least partially orient the abrasive particles substantially during at least part of their journey over the falling path and abrasive particles scattered on the abrasive means backing are at least substantially free from an influence of the electromagnetic field.

Furthermore, it is proposed that the abrasive particles, for an at least partial orientation, pass through at least one screening region of the falling path, which region is screened from the electromagnetic field, and at least one slot-like active region of the falling path. A "screening region" is to be understood in particular to mean a region of the falling path screened by at least one screening unit against an influence of the electromagnetic field. A "slot-like active region" is to be understood to mean in particular a region of the falling path in which the electromagnetic field is effective, and is small compared with the screening region. The slot-like active region is advantageously arranged at a short distance from the abrasive means backing.

A device for carrying out a method according to the invention is also proposed.

The method according to the invention is not to be limited here to the above-mentioned application and embodiment. In particular, the method according to the invention, in order to perform a function described herein, may have a number of individual method steps deviating from a number specified herein. A device for carrying out the method according to the invention may also have a number of individual elements, components and units deviating from a number specified herein.

The invention proceeds from a method for producing an abrasive means using a shaping means that has cavities into which a dispersion of abrasive particles for shaping the abrasive particles is introduced.

It is proposed for the abrasive particles to be placed on an abrasive particle carrier of the abrasive means in an arrangement given by an arrangement of the cavities in the shaping means. An "abrasive means" is to be understood to mean in particular an insert tool having a large number of abrasive particles. The abrasive means is advantageously provided for the chip-removing machining of a surface and/or for cutting. The abrasive particles can machine a workpiece by means of undefined cutting edges in accordance with the usual definition of an abrasive method. With a sufficiently accurate positioning of the abrasive particles on the abrasive means backing, machining can be performed by means of defined cutting edges. In particular, the abrasive particles of the abrasive means are distributed in particular irregularly over at least a partial area. The abrasive means is formed as an abrasive means appearing expedient to a person skilled in the art, but in particular as an abrasive disk and/or as an abrasive paper. In particular, the abrasive means is suitable for surface abrasion and/or for depth abrasion. In particular, the abrasive means is intended to be used by means of a hand tool appearing expedient to a person skilled in the art, but advantageously by means of an orbital sander, a random orbit sander, a delta sander, an angle sander and/or a belt sander. Alternatively or additionally, the abrasive means could be intended for manual use by a user. In particular, a "shaping means" is to be understood to mean a means that is provided to give the abrasive particles a shape during production. In particular, the dispersion when producing the abrasive particles is filled into the cavities of the shaping means. The abrasive particles advantageously dry during their production in the cavities of the shaping means.

The term "cavities" is to be understood to mean cutouts delimited by the shaping means, which cutouts are intended in each case for the shaping of an abrasive particle. The cavities are preferably delimited by the shaping means at least substantially in a target shape of the abrasive particles. In particular, the cavities are complementary to the abrasive particles to be produced. In particular, the final shape of the abrasive particles deviates from the shape of the cavities by a change in shape during a drying and/or sintering. In particular, a "dispersion" is to be understood to mean a shapeable, advantageously free-flowing mass, from which the abrasive particles are produced, in particular by sintering. In particular, the dispersion for producing abrasive particles comprises substances appearing expedient to a person skilled in the art, but preferably a silicon carbide, a boron nitride, boron carbide and/or preferably a metal oxide, such as a beryllium oxide and/or advantageously an aluminum oxide, particularly advantageously $\alpha$-$Al_2O_3$. In particular the dispersion, as described for example in document EP 0 615 816 A1, comprises further substances appearing expedient to a person skilled in the art. A "shaping" is to be understood to mean in particular a process in which some of the dispersion is introduced into one of the cavities, this portion of the dispersion assumes a shape of the cavity, and cures at least partially at least substantially in the shape of the cavity. In particular, an "abrasive particle" is to be understood to be a means that in at least one operating state has an edge that removes material from a workpiece during a workpiece machining. The abrasive particles preferably have a volume less than 5 $mm^3$, advantageously less than 2 $mm^3$, particularly advantageously less than 1 $mm^3$. In particular, the abrasive particles are of a size that is suitable for providing an abrasive means having a grain size appearing expedient to a person skilled in the art, which in particular leads to an abrasion result achievable with a grain size between P12 and P5000. In particular, the abrasive particles are each formed separately from one another in at least one operating state. The abrasive particles have a shape appearing expedient to a person skilled in the art. In particular, the abrasive particles have concave, convex and/or flat surface regions. Here, different surface regions of the abrasive particles may have different shapes. In particular, the produced abrasive particles consist at least substantially of a ceramic material, advantageously of a polycrystalline ceramic material. Furthermore, the abrasive particles may advantageously be coated. In particular, the term "introduced" is to be understood to mean that the dispersion flows into the cavities, is pressed into the cavities and/or is sucked into the cavities. The dispersion preferably fills the cavities at least substantially completely following the introduction. An "arrangement of the cavities" is to be understood to mean in particular a spatial arrangement of the cavities on the shaping means relative to one another. The cavities are arranged in a pattern appearing expedient to a person skilled in the art. The cavities are preferably arranged such that placed abrasive particles in the event of an intended abrasive movement of the abrasive means achieve an advantageous material removal and/or an advantageous surface of the workpiece as a result of the arrangement of the cavities. In particular, two abrasive particles arranged in succession in the abrading direction are arranged offset from one another by a certain value in a direction perpendicularly to the abrading direction. In particular, an "abrasive particle carrier" is to be understood to be a means of the abrasive means intended to arrange the abrasive particles relative to one another separately from the shaping means in at least one operating state. The abrasive particle carrier is preferably formed separately from an abrasive means backing of the abrasive means in at least one method step. In an alternative exemplary embodiment the abrasive means carrier and the abrasive means backing could be formed by the same component. The term "placed in a given arrangement" is to be understood to mean in particular that the arrangement of the abrasive particles on the shaping means is transferred at least substantially to the abrasive means. In particular, an arrangement of the abrasive particles on the abrasive particle carrier and/or in particular on the abrasive means backing is dependent on an arrangement of the cavities on the shaping means. A surface of the shaping means adjacent to the cavities preferably has a shape dependent on a shape of an abrasive means backing. Alternatively, the surface of the shaping means adjacent to the cavities could have a another shape appearing expedient to a person skilled in the art, for example could be flat. Furthermore, the shaping means by way of example could be formed at least partially cylindrically. By means of the method according to the invention, an abrasive means that is particularly effective and/or has a particularly long service life can be produced with a low production outlay. In particular, it is possible to dispense with at least one additional process step for arranging the abrasive particles.

In a further embodiment, in order to place the abrasive particles on the abrasive particle carrier, it is proposed for the shaping means to be brought toward the abrasive particle carrier of the abrasive means, whereby it is advantageously possible to dispense with a process step in which the abrasive particles are transported in the arrangement given by the shaping means. In particular, the term "bring toward" is to be understood to mean that a distance between the shaping means and the abrasive particle carrier is reduced for the placement of the abrasive particles. The shaping means and the abrasive particle carrier are preferably placed against one another for the placement of the abrasive particles. The shaping means and the abrasive particle carrier are preferably pressed against one another for the placement of the abrasive particles.

Furthermore, it is proposed for the abrasive particles to be placed on the abrasive particle carrier, which is flexible, whereby abrasive particles advantageously can be produced in a flat shaping means and can be attached in a structurally simple manner to an abrasive means backing which in particular is uneven. In particular, the term "flexible" is to be understood to mean that the abrasive particle carrier in at least one operating state, in particular before it is advantageously connected in an integrally bonded manner to the abrasive means backing, can be deformed in order to match a shape of the abrasive means backing. A region of the abrasive particle carrier is preferably deformed relative to another region of the abrasive particle carrier during a production of the abrasive means by more than 5 mm, advantageously more than 10 mm, particularly advantageously more than 20 mm.

It is also proposed for the abrasive particle carrier to be adhesively bonded on an abrasive means backing of the abrasive means, whereby a connection that can be easily produced is possible. An "abrasive means backing" is to be understood to mean in particular a means of the abrasive means that shapes a region of the abrasive means occupied by the abrasive particles. In particular, the abrasive means backing is flexible or at least substantially dimensionally stable during a machining pass. The abrasive means backing preferably comprises at least one layer formed from paper, vulcanized fiber, film, textile material and/or foam. In particular, the abrasive means backing comprises a composite material. In particular, the term "adhesively bond" is to be understood to mean that the abrasive means backing and the abrasive particle carrier are connected to one another in an integrally bonded manner, more specifically advantageously by means of at least one adhesive, in particular a base binder appearing expedient to a person skilled in the art, for example a phenol resin and/or an epoxy resin. Furthermore, the abrasive means could comprise at least one top binder appearing expedient to a person skilled in the art.

Furthermore, it is proposed for the abrasive particles to be sintered in the cavities of the shaping means, whereby the abrasive particles following the sintering can be applied directly to an economical abrasive particle carrier and/or an economical abrasive means backing, which was destroyed at a sintering temperature. In particular, the term "sintering" is to be understood to mean a processing procedure in which material properties of the abrasive particles are modified by the influence of heat, in particular with at least 500° C., advantageously more than 750° C., particularly advantageously more than 850° C. The abrasive particles following the sintering preferably comprise ceramic material. The term "sintered in the cavities" is to be understood to mean in particular that the shaping means, in order to sinter the abrasive particles, is heated with the abrasive particles to be sintered. In particular, the shaping means is intended to withstand a sintering temperature of the abrasive particles.

In an advantageous embodiment of the invention it is proposed for the abrasive particles, following a sintering of the abrasive particles, to be applied to the abrasive particle carrier, whereby the abrasive particles can be sintered separately from the abrasive particle carrier. In particular, the term "following a sintering" is to be understood to mean that the abrasive particles are removed from the cavities only in the sintered state and are then applied to the abrasive particle carrier. The term "apply" is to be understood to mean in particular a procedure in which the abrasive particles are connected to the abrasive particle carrier and/or the abrasive means backing.

Furthermore, it is proposed for the abrasive particles to be applied in a green state from the cavities of the shaping means onto the abrasive particle carrier, whereby simple shaping means, for example made of silicone, can be used. A "green state" is to be understood to mean in particular a state of the abrasive particles prior to the sintering. In particular, the abrasive particles are dried in the green state. The abrasive particles are advantageously dimensionally stable in the green state, in particular by drying.

It is also proposed for the abrasive particles and the abrasive particle carrier to be sintered jointly, whereby a simple production with advantageously arranged abrasive particles is possible. In particular, a "joint sintering" is to be understood to mean that the abrasive particles are attached on the abrasive particle carrier prior to the sintering. In particular, the abrasive particles and the abrasive particle carrier are heated jointly for sintering. By way of example, the abrasive particles and the abrasive particle carrier could be connected before or during the sintering, in particular by means of a connecting substance.

The method according to the invention for producing an abrasive means is not to be limited here to the above-described method. In particular, the method according to the invention for producing an abrasive means, in order to perform a function described herein, may have a number of individual elements, components and units deviating from a number specified herein.

BRIEF DESCRIPTION OF THE DRAWINGS

Further advantages will emerge from the following description of the drawings. Nine exemplary embodiments of the invention are presented in the drawings. The drawings, the description and the claims contain numerous features in combination. A person skilled in the art will also consider the features individually where appropriate and combine said features to provide useful, further combinations In the drawings:

DETAILED DESCRIPTION

Figure 1:
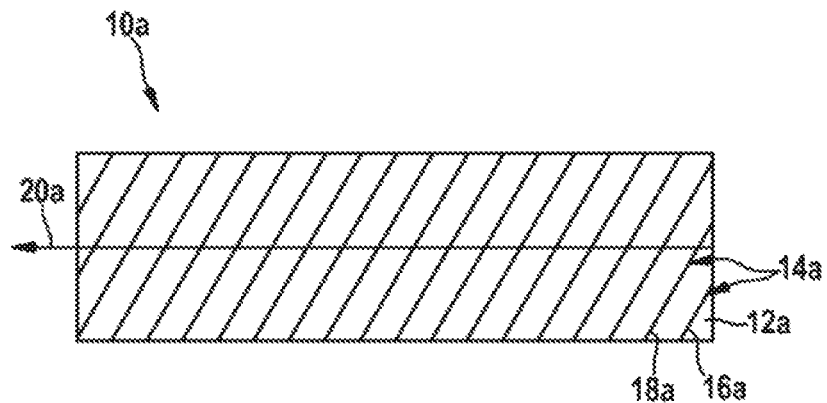
FIG. 1 shows an abrasive means according to the invention with an abrasive means backing having a rectangular basic shape and with abrasive particles applied in diagonal strips, a large proportion of said abrasive particles forming abrasive edge units having an abrasive edge inclined at a defined angle between 0° and 90° relative to a defined machining direction.

FIG. 1 shows an abrasive means 10a according to the invention with an abrasive means backing 12a having a rectangular basic shape and with abrasive particles 14*a* applied in diagonal strips, which form the abrasive edge units 16*a*, 18*a* (further abrasive edge units have not been provided in the drawings with a reference sign for reasons of clarity) having an abrasive edge inclined at an angle between 0° and 90° relative to a defined machining direction 20*a*. The angle is 70° and the abrasive edge units 16*a*, 18*a* are formed by rows of adjacently arranged abrasive particles 14*a*. The angle relative to the defined machining direction 20*a* is formed by a defined angle by means of a course of the rows of adjacently arranged abrasive particles 14*a*, and the angle can be selected purposefully by changing the course of the rows. The abrasive particles 14*a* are purposefully placed and are applied to the abrasive means backing 12*a* on individual adhesive elements in the form of rows. A shearing cut characteristic is achieved by the course of the rows of adjacently arranged abrasive particles 14*a*, with which characteristic a high surface quality is achieved during machining.

FIGS. 2 to 11 show eight further exemplary embodiments of the invention. The following descriptions and the drawings are limited fundamentally to the differences between the exemplary embodiments, wherein, with respect to identically named components, in particular with respect to components having identical reference signs, reference is also made in principle to the drawings and/or the description of the other exemplary embodiments, in particular of FIG. 1. In order to distinguish between the exemplary embodiments, the letter a has been placed after the reference signs of the exemplary embodiment in FIG. 1. In the exemplary embodiments of FIGS. 2 to 11, the letter a has been replaced by the letters b to i.

Figure 2:
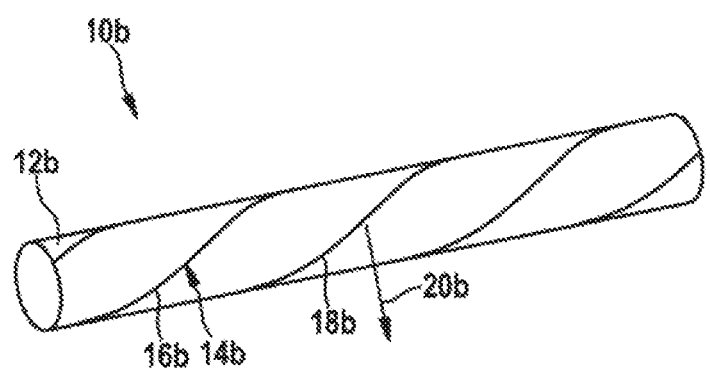
FIG. 2 shows an abrasive means according to the invention with an abrasive means backing in the form of a cylindrical roller.

FIG. 2 illustrates a further exemplary embodiment of an abrasive means according to the invention 10*b* with an abrasive means backing 12*b*, which is formed as a cylindrical roller. Abrasive particles 14*b* applied in diagonal strips form abrasive edge units 16*b*, 18*b* (further abrasive edge units have not been provided in the drawings with a reference sign for reasons of clarity) having an abrasive edge, which is inclined in each case at an angle between 0° and 90° relative to a defined machining direction 20*b*. The abrasive edge units 16*b*, 18*b* are formed by rows of adjacently arranged abrasive particles 14*b*. The angle in FIG. 2 is 68° and can be adjusted by selecting a direction for the course of the rows of adjacently arranged abrasive particles 14*b*. The abrasive particles 14*b* are purposefully placed and are applied to the abrasive means backing 12*b* on individual adhesive elements in the form of rows. Due to the course of the rows of adjacently arranged abrasive particles 14*b*, a shearing cut characteristic is achieved, with which a high surface quality is achieved during machining.

Figure 3:
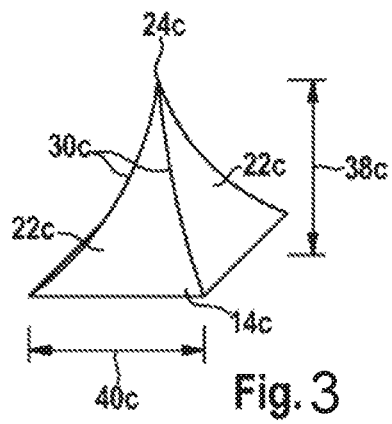
FIG. 3 shows an abrasive particle of an abrasive means according to the invention with a pyramidal shape having curved side faces, which converge at a central tip.
Figure 4:
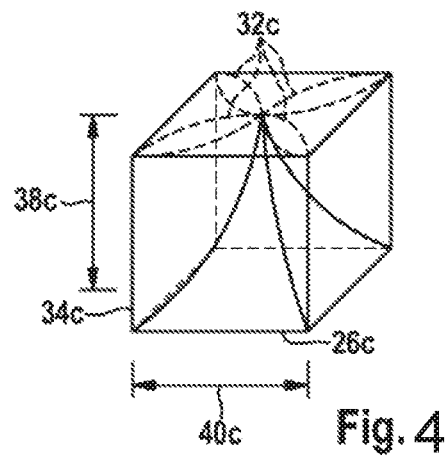
FIG. 4 shows a production of the abrasive particle from FIG. 3 from a square starting cuboid.

FIG. 3 shows an exemplary abrasive particle 14*c* for an abrasive means according to the invention. The abrasive particle 14*c* has a pyramidal basic shape with a square base area 26*c*, curved edges 30*c*, which delimit side faces 22*c*, which converge in an abrasive tip 24*b*, which is arranged above a center point of the base area 26*c* and is thus formed as a central tip. A ratio between a height 38*c* of the abrasive particle 14*c* and a diameter 40*c* of the base area 26*c* of the abrasive particle 14*c* has a value of one. The abrasive particle 14*c* is intended in particular for a use in an abrasive means 10*a*, 10*b* from the preceding exemplary embodiments. A production of the abrasive particle 14*c* can be achieved for example by abrading a square starting body 34*c* having four removal lines 32*c*, starting from one side, wherein, during the course of the abrasion, a radius of the removal lines 32*c* is continuously extended (FIG. 4). In an alternative production method, the abrasive particles 14*c* can be produced by way of example by a casting process in a mold or by another production method appearing suitable to a person skilled in the art.

Figure 5:
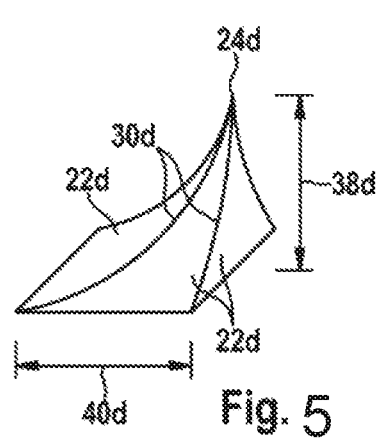
FIG. 5 shows an abrasive particle of an abrasive means according to the invention with a pyramidal shape having curved side faces, which converge at a side tip.
Figure 6:
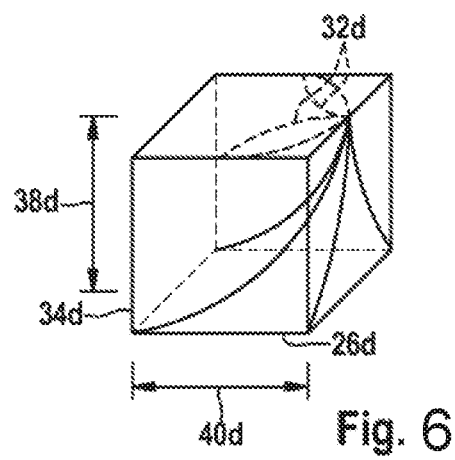
FIG. 6 shows a production of the abrasive particle from FIG. 5 from a square starting cuboid.

FIG. 5 shows a further exemplary abrasive particle 14*d*, which is formed substantially identically to the previous exemplary embodiment, wherein the main difference lies in the fact that an abrasive tip 24*d* is not formed as a central tip, but as a side tip, which is arranged above a side edge of a base area 26*d* of the abrasive particle 14*d*. A production of the abrasive particle 14*d* can be achieved by way of example by abrading a square starting body 34*c* with three removal lines 32*d*, starting from one side, wherein a radius of the removal lines 32*d* is continuously extended over the course of the abrasion (FIG. 6). In an alternative production method the abrasive particle 14*d* can be produced by way of example by a casting process in a mold or by another production method appearing suitable to a person skilled in the art.

Figure 7:
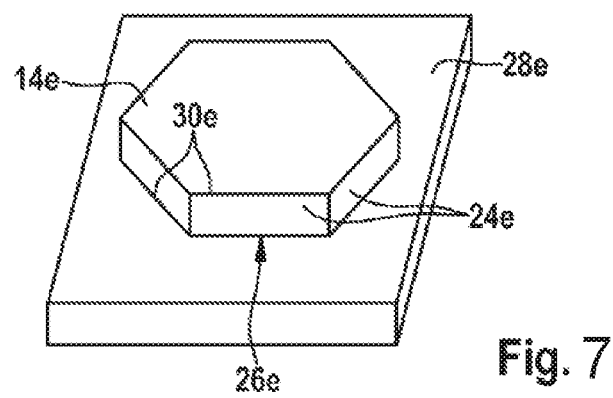
FIG. 7 shows an abrasive particle of an abrasive means according to the invention with a hexagonal base area.

FIG. 7 shows a third exemplary abrasive particle 14*e*, which has a prismatic sub-element. The prismatic sub-element forms a main body of the abrasive particle 14*e* and is hexagonal. The abrasive particle 14*e* thus has a surface contour described by a convex envelope. Edges 30*e* of a hexagon shape of the abrasive particle 14*e* are oriented such that an abrasive edge inclined at an angle between 0° and 90° relative to a defined machining direction (not illustrated) is achieved with a high level of likelihood when the abrasive particle 14*e* is scattered onto an abrasive means backing (not illustrated). The individual abrasive particles 14*e* thus each form an abrasive edge unit. Due to the abrasive particles 14*e*, an abrasive means having a shearing cut characteristic can thus be achieved, even with arbitrary scattering. The abrasive particle 14*e* may optionally comprise a base body 28*e* (illustrated by a dashed line), which preferably has a cuboidal design and with which a defined arrangement of the abrasive particles 14*e* on an abrasive means backing (not illustrated) can be achieved. In particular, the abrasive particles 14*e* can be purposefully placed by means of the base body 28*e*. With a purposeful placement the abrasive particles 14*e* are preferably placed directly against one another by means of the base bodies 28*e*, whereby the edges 30*e* enclose a defined angle with a defined machining direction.

Figure 8:
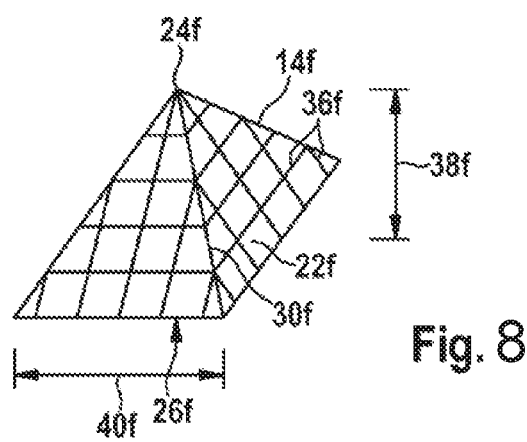
FIG. 8 shows an abrasive particle of an abrasive means according to the invention with a pyramidal shape having setback surface regions in groove form for controlled breaking for a self-sharpening effect.

FIG. 8 shows a fourth exemplary abrasive particle 14*f*, which has a pyramidal basic shape with a square base area 26*f*, an abrasive tip 24*f* formed as a central tip, in which tip edges 30*f* of the abrasive particle 14*f* converge. The abrasive particle 14*f* may be used advantageously instead of an abrasive particle shape of the first two abrasive particles 14*c*, 14*d*. A ratio between a height 38*f* of the abrasive particle 14*f* and a diameter 40*f* of the base area 26*f* of the abrasive particle 14*f* has a value of 0.8. The abrasive particle 14*f* also has setback surface regions, which are formed as grooves 36*f* and which serve as predetermined breaking points for a controlled breaking of the abrasive particle 14*f*. The abrasive particle 14*f* thus has a self-sharpening effect and an abrasive means comprising abrasive particles 14*f* has a largely uniform abrasive capacity during the entire service life. In the shown exemplary abrasive particle 14*f* the grooves 36*f* extend substantially parallel to edges of the base area 26*f*. However, alternative arrangements of the grooves 36*f* are also conceivable, for example an arrangement that is rotated through 45° relative to the illustrated arrangement, such that the grooves 36*f* and/or new edges created at the grooves 36*f* as a result of abrasive particle regions having broken off result in a shearing cut characteristic.

Figure 9:
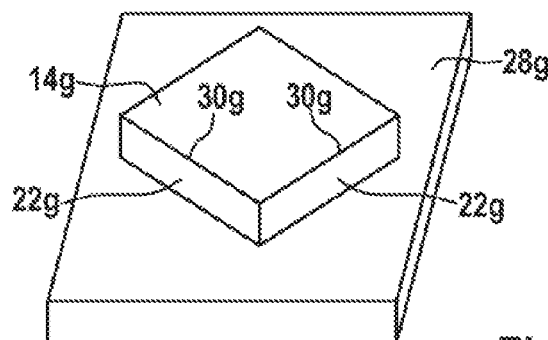
FIG. 9 shows an abrasive particle of an abrasive means according to the invention with a prismatically formed sub-element, which is formed as a square element, and with a base body.

In FIG. 9 a fifth exemplary abrasive particle 14g, which has a prismatic sub-element, is illustrated. The prismatic sub-element is formed as a main body of the abrasive particle 14g, having a cuboidal design with a square main body. The abrasive particle 14g thus has a surface contour described by a convex envelope. The prismatic sub-element is arranged on a base body 28g, which has a cuboidal, quadrangular design, wherein the base body 28g is rotated relative to the sub-element. On account of the rotation of the base body 28g relative to the prismatic sub-element, a scattering of the abrasive particles 14g with an orientation of edges 30g inclined at an angle between 0° and 90° relative to a defined machining direction (not illustrated) is achieved with a high likelihood with an arbitrary scattering of the abrasive particle 14g onto a abrasive means backing (not illustrated). Individual abrasive particles 14g thus each form an individual abrasive edge unit. The abrasive particles 14g can be captured on the respective base bodies 28g in an exemplary method and can be purposefully placed onto the abrasive means backing, wherein the base bodies 28g can be arranged simply adjacently in a space-filling manner on account of the cuboidal, quadrangular design. On account of the rotation of the base body 28g relative to the prismatic sub-element, the abrasive particles 14g then form abrasive edge units having abrasive edges inclined at a defined angle, which can be adjusted by selection of a certain rotation, between 0° and 90° relative to a defined machining direction.

Figure 10:
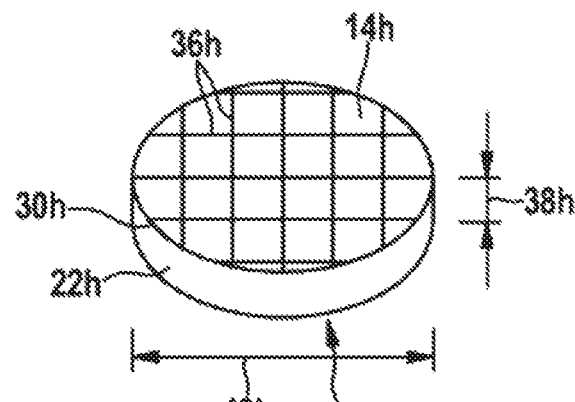
FIG. 10 shows an abrasive particle of an abrasive means according to the invention with an oval base area.

A sixth exemplary abrasive particle 14h is illustrated in FIG. 10. The abrasive particle 14h has an oval base area 26h. A surface parallel to the base area 26h has a peripheral edge 30h for abrasion. The abrasive particle 14h thus has a surface contour described by a convex envelope. When scattered onto an abrasive means backing (not illustrated), the abrasive particles 14h come to lie with a high likelihood such that portions of the edge 30h are inclined at an angle between 0° and 90° relative to a defined machining direction. A ratio between a height 38h of the abrasive particle 14h and a diameter of 40h of the base area 26h of the abrasive particle 14h has a value of 0.5. In alternative embodiments of the abrasive particle 14h, it is also conceivable for the ratio between the height 38h of the abrasive particle 14h and the diameter 40h of the base area 26h of the abrasive particle 14h to have another value, preferably a value between 0.3 and 1.2. On the base area 26h and the surface parallel thereto, the abrasive particle 14h has setback surface regions, which are formed as grooves 36h and serve as predetermined breaking points for a controlled breaking of the abrasive particle 14h. The grooves 36h also form micro-edges, at which a further material removal takes place in the abrasion process.

Figure 11:
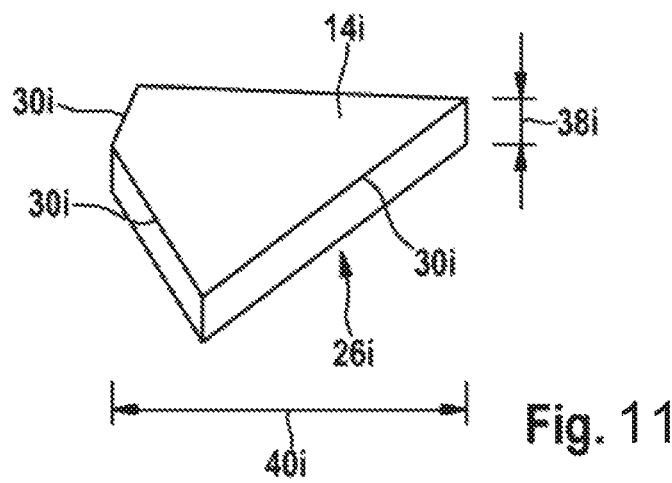
FIG. 11 shows an abrasive particle of an abrasive means according to the invention with a prismatically formed sub-element, which is formed as an irregular cuboid.
Figure 12:
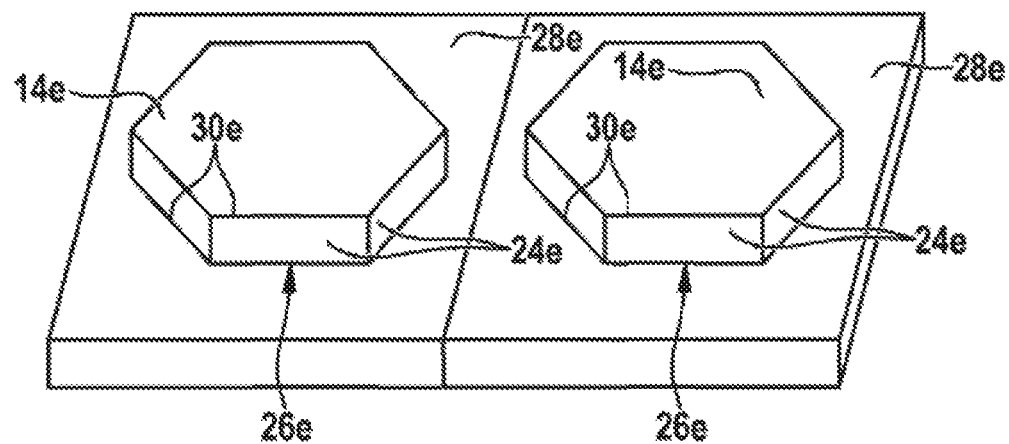
FIG. 12 shows the abrasive particle of FIG. 7 in duplicate and interconnected along a corresponding base body of each of the abrasive particles.
Figure 13:
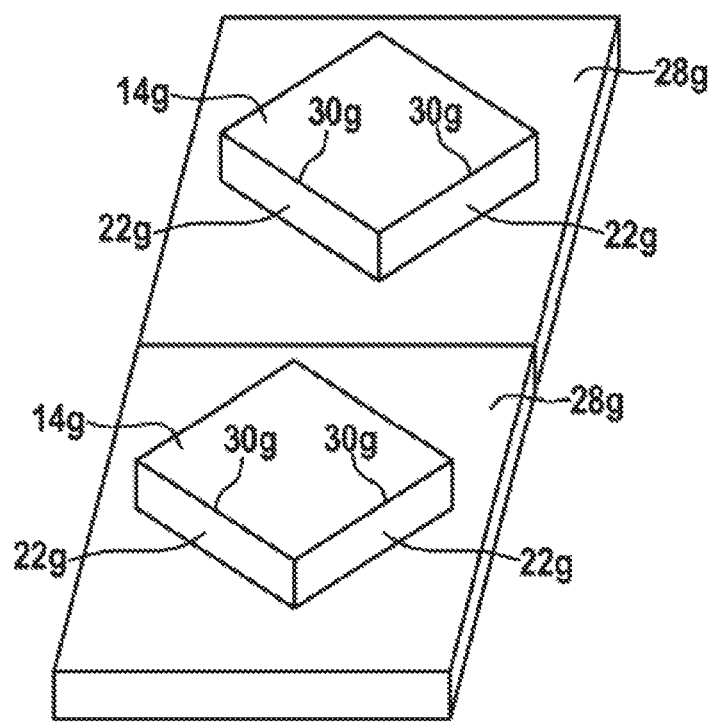
FIG. 13 shows the abrasive particle of FIG. 9 in duplicate and interconnected along a corresponding base body of each of the abrasive particles.

In FIG. 11 a seventh exemplary abrasive particle 14i is illustrated. The abrasive particle 14i has a prismatic sub-element, which is formed as the body of the abrasive particle 14i. The prismatic body of the abrasive particle 14i is formed as an irregular cuboid with a base area 26i, two blunt edges 30i, and two sharp edges 30i. A ratio between a height 38i of the abrasive particle 14i and a diameter 40i of the base area 26i of the abrasive particle 14i has a value of 0.5. In alternative embodiments of the abrasive particle 14i it is also conceivable for the ratio between the height 38i of the abrasive particle 14i and the diameter 40i of the base area 26i of the abrasive particle 14i to have a different value, preferably a value between 0.3 and 1.2. When scattered onto an abrasive means backing (not illustrated), the abrasive particles 14i come to rest with a high likelihood such that the edges 30i are inclined at an angle between 0° and 90° relative to a defined machining direction. In principle, the abrasive particle 14i may also be provided with a base body (not illustrated), and a plurality of abrasive particles 14i may be purposefully placed against one another on the base bodies in order to set a defined angle of the edges 30i relative to a defined machining direction. A chip removal by means of the sharp edges 30i is particularly advantageous in the case of relatively soft materials of a workpiece, whereas a chip removal by means of the sharp edges 30i is preferred in the case of relatively hard materials of a workpiece. An abrasive means with purposefully placed abrasive particles 14i thus has a different cutting pattern depending on the selection of the machining direction.

Figure 14:
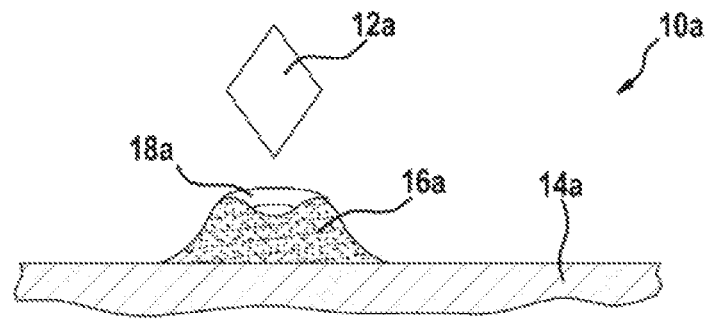
FIG. 14 shows a schematic representation of a process step of a method according to the invention for applying abrasive particles on an abrasive means backing, in which abrasive particles are purposefully placed on the abrasive means backing on adhesive elements applied at certain points.

FIG. 14 shows a process step of a method according to the invention for applying abrasive particles 12a to an abrasive means backing 14a, in which abrasive particles 12a are purposefully placed on the abrasive means backing 14a. The abrasive particles 12a are applied to adhesive elements 16a applied at certain points on the abrasive means backing 14a. For this purpose, the abrasive particles 12a are scattered onto the abrasive means backing 14a, wherein abrasive particles 12a scattered over the adhesive elements 16a applied at certain points on the abrasive means backing 14a are retained by the adhesive elements 16a applied at certain points. Abrasive particles 12a that have fallen onto the abrasive means backing 14a outside the adhesive elements 16a applied at certain points are removed by being blown off by air in a process step not illustrated. In an alternative embodiment the abrasive particles 12a can be applied in an electrostatic scattering method on adhesive elements 16 applied at certain points, against the effect of the force of gravity. The particles that do not contact an adhesive point fall down again. The abrasive particles 12a are produced from ceramic aluminum oxide, wherein other materials can also be used in principle for production, and have a diamond-shaped form in cross section, wherein the method according to the invention can also be used for abrasive particles 12a of deviating designs. The adhesive elements 16a applied at certain points have an indentation 18a in order to receive the abrasive particles 12a, wherein scattered abrasive particles 12a are drawn to a center of the indentation 18a on account of the effect of the force of gravity and are oriented during this process. FIG. 14, in order to explain a basic principle of the method according to the invention, illustrates how an individual abrasive particle 12a is applied to an adhesive element 16a applied at certain points on an abrasive means backing 14a. In one embodiment of the method a plurality of abrasive particles 12a are preferably applied to an individual adhesive element 16a, such that, by means of the adhesive elements 16a applied at certain points on the abrasive means backing 14a, the abrasive particles 12a are purposefully placed in abrasive particle groups 20a arranged at a predefined distance from one another.

Figure 15:
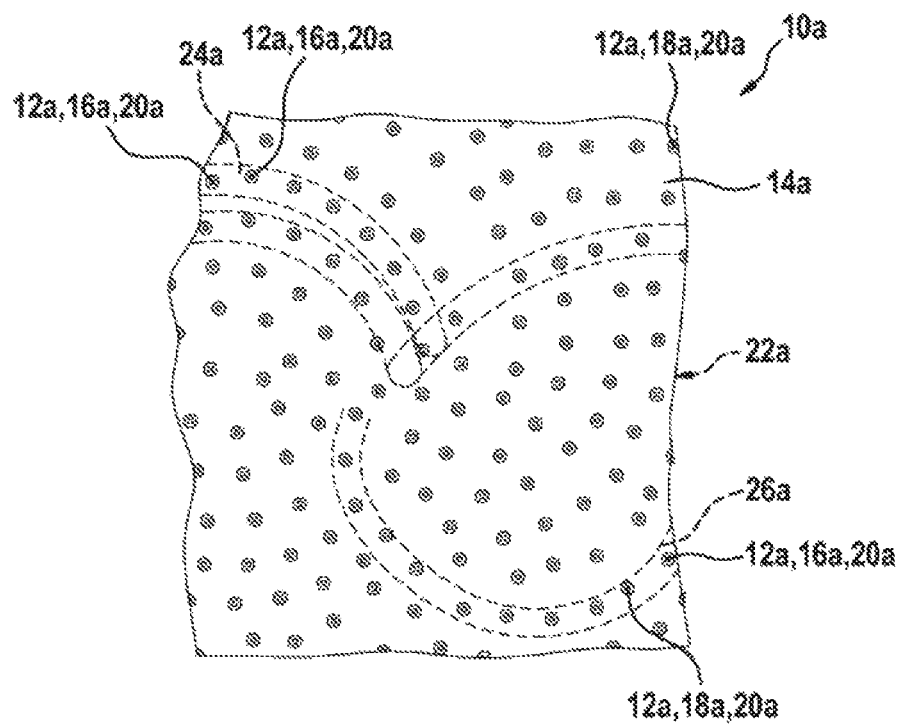
FIG. 15 shows the abrasive means produced using the method according to the invention with an arrangement of the purposefully placed abrasive particles in the form of a Fibonacci spiral.

FIG. 15 shows an abrasive means 10a produced using the method according to the invention, wherein, in the method, the abrasive particles 12a have been applied to the abrasive means backing 14a in the form of a spiral 22a. Individual elements of the spirals 22a formed by the abrasive particle groups 20a formed by groups of abrasive particles 12a fastened to adhesive elements 16a applied at certain points to the abrasive means backing 14a. The abrasive particles 12a are applied in the form of a Fibonacci spiral, in which a position of individual elements of the spirals 22a is described by a course through corner points of squares arranged adjacently to one another and in succession in an anticlockwise direction, wherein the side lengths of the squares arranged in succession in an anticlockwise direction are arranged at a ratio to one another predefined by a Fibonacci sequence, wherein an orientation of the corner points of successive squares, through which the Fibonacci spiral runs, likewise alternates in an anticlockwise direction. The Fibonacci spiral comprises a plurality of spiral arms 24a, 26a. By means of the application in the form of a Fibonacci spiral, a shadowing of abrasive particles 12a arranged in succession in a loop direction is avoided in particular, as a result of which an abrasive capacity of one abrasive particle 12a arranged after another abrasive particle 12a in the loop direction or of one abrasive particle group 20a arranged after another abrasive particle group 20a in the loop direction is reduced. On account of a positioning of the abrasive particle groups 20a in the form of a Fibonacci spiral, a shadowing of abrasive particle groups 20a when using the abrasive means 10a is avoided both in the case of a purely rotational abrasive process and in the case of belt sanding or random orbit sanding.

FIGS. 16 to 25 show seven further exemplary embodiments of the invention. The following descriptions and the drawings are limited fundamentally to the differences between the exemplary embodiments, wherein, with respect to identically named components, in particular with respect to components having identical reference signs, reference is also made in principle to the drawings and/or the description of the other exemplary embodiments, in particular of FIGS. 14 to 15. In order to distinguish between the exemplary embodiments, the letter a has been placed after the reference signs of the exemplary embodiment in FIGS. 14 to 15. In the exemplary embodiments of FIGS. 16 to 24, the letter a has been replaced by the letters b to g.

Figure 16:
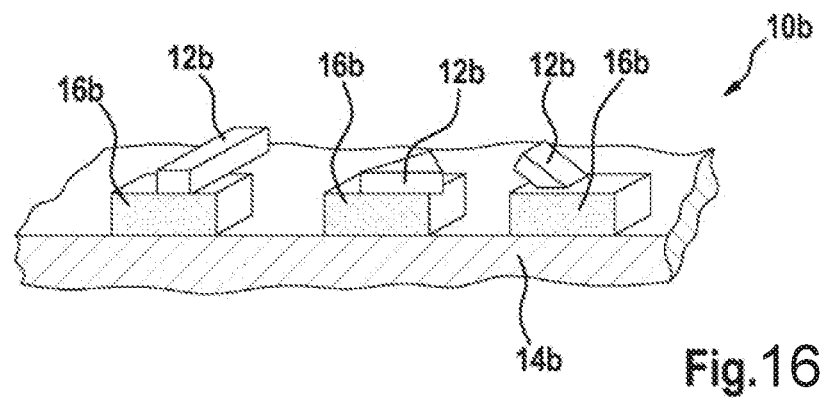
FIG. 16 shows a process step of an alternative method according to the invention for applying abrasive particles to an abrasive means backing, in which abrasive particles are purposefully placed on the abrasive means backing on adhesive elements applied at certain points.
Figure 17:
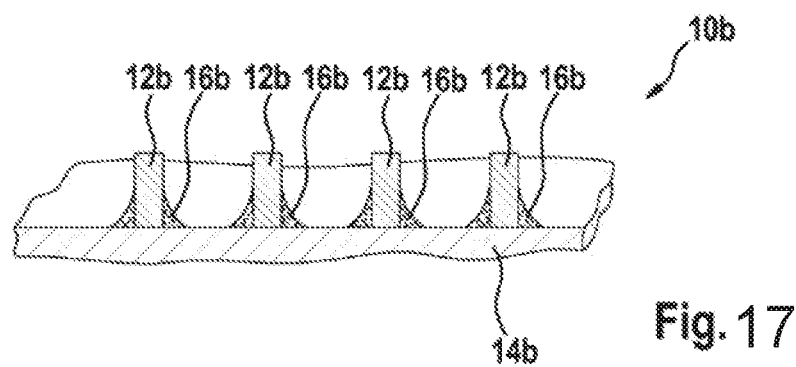
FIG. 17 shows a further process step of the alternative method according to the invention, in which the abrasive particles have been oriented by heating the adhesive elements applied at certain points.

FIG. 16 shows a process step of an alternative method according to the invention for applying abrasive particles 12b to an abrasive means backing 14b, in which abrasive particles 12b are purposefully placed on the abrasive means backing 14b on adhesive elements 16b applied at certain points to the abrasive means backing 14b. By means of a process step of blowing off (not illustrated), abrasive particles 12b not scattered onto the adhesive elements 16b are removed from the abrasive means backing 14b. The abrasive particles 12b are oriented on the adhesive elements 16b applied at certain points by a surface tension generated by means of heating (FIG. 17). During the heating, a material of the adhesive element 16b applied at certain points transitions from a solid state into a liquid state, in which the material is adhesive, and cures in air once the heating is complete. During the heating of the adhesive elements 16b applied at certain points, the abrasive particle 12b is oriented in that different portions of the adhesive element 16b applied at certain points, which portions are arranged on different sides of the abrasive particle 12b, transition at different moments in time from the solid into the liquid state, thus resulting in a difference of surface tensions, by means of which the abrasive particle 12b is oriented. The abrasive particles 12b have an elongate basic shape. In an abrasive means 10b produced using the alternative method according to the invention, a high abrasive capacity is thus achieved. In an alternative embodiment of the method, the process step of blowing off abrasive particles 12b not scattered onto an adhesive element 16b is omitted and the abrasive particles 12b not scattered onto an adhesive element 16b are separated by means of the force of gravity following heating and curing of the adhesive elements 16b, and in particular are shaken off or blown off by air.

Figure 18:
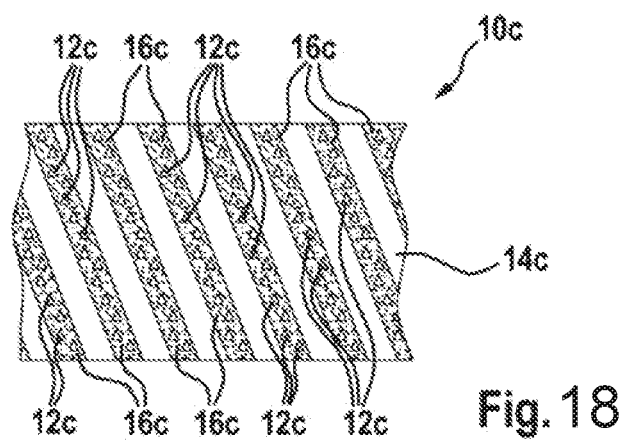
FIG. 18 shows an alternative exemplary embodiment of an abrasive means, in which abrasive particles have been purposefully placed in diagonal strips and which has been produced using the method according to the invention.

FIG. 18 shows a third variant of an abrasive means 10c that has been produced using a method according to the invention for applying abrasive particles 12c to an abrasive means backing 14c, in which abrasive particles 12c are purposefully placed on the abrasive means backing 14c. The abrasive particles 12c have been applied to the abrasive means backing 14c on adhesive elements 16c, which have been applied at certain points and which have been applied in the form of diagonal strips on the abrasive means backing. Abrasive particles 12c are scattered onto the abrasive means backing 14c and remain adhered to the adhesive element 16c. The abrasive means 10c is intended for use in belt sanding.

Figure 19:
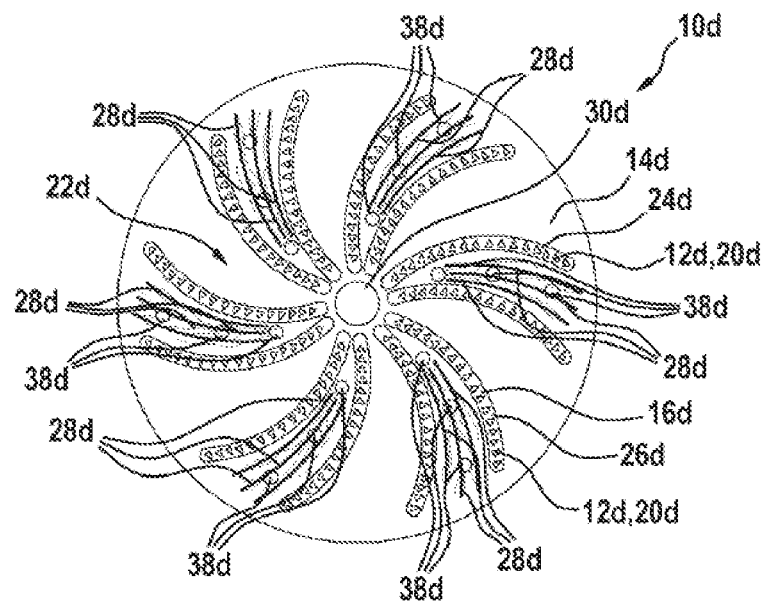
FIG. 19 shows a fourth alternative exemplary embodiment of an abrasive means produced using a method according to the invention, in which the abrasive particles have been purposefully placed in an arrangement intended for a purposeful generation of an airflow in an abrading operating mode.

In a fourth variant of an abrasive means 10d, which has been produced using a method according to the invention for applying abrasive particles 12d to an abrasive means backing 14d, in which abrasive particles 12d are purposefully placed on the abrasive means backing 14d, the abrasive particles 12d are placed in an arrangement that is intended for the purposeful generation of an airflow 28d in an abrading operating mode (FIG. 19). The airflow 28d carries abrasive dust, created in the abrading operating mode, to suction holes 30d. The abrasive particles 12d are applied in the form of a spiral 22d, wherein spiral arms 24d, 26d of the spiral 22d are formed by adhesive elements 16d applied at certain points on the abrasive means backing 14d and by abrasive particles 12d scattered onto said adhesive elements. The abrasive particles 12d and the adhesive elements 16d applied at certain points on the abrasive means backing 14d are formed with respect to a height above the abrasive means backing 14d and a distance between spiral arms 24d, 26e such that, in combination with a purely rotational movement of the abrasive means 10d in the abrading operating mode, an airflow 28d sufficient to remove the abrasion dust is generated.

Figure 20:
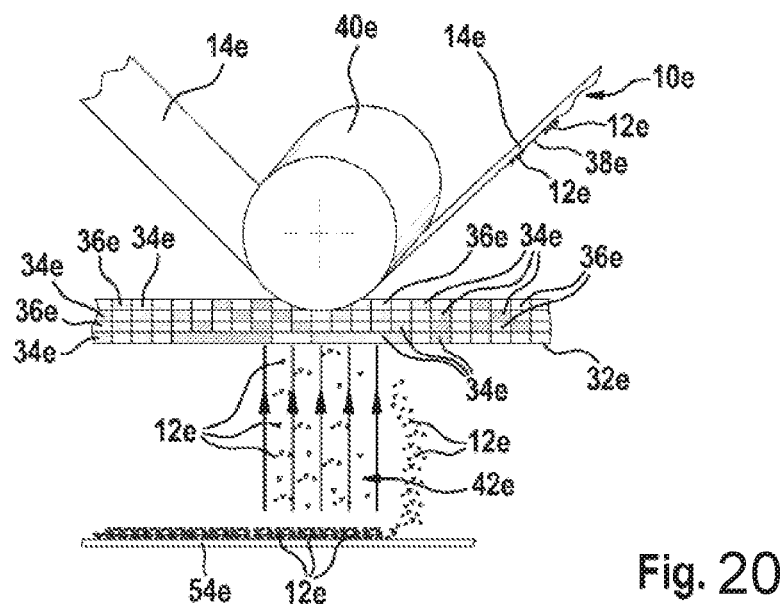
FIG. 20 shows a fifth alternative embodiment of a method according to the invention, in which free regions on an abrasive means backing are obtained purposefully in an electrostatic scattering process by means of a part-retention device by a retaining certain abrasive particle fractions during the course of the scattering.

In FIG. 20 a fifth alternative embodiment of a method according to the invention for applying abrasive particles 12e to an abrasive means backing 14e is illustrated, in which abrasive particles 12e are purposefully placed on the abrasive means backing 14e. In a scattering process, free regions 38e are obtained purposefully on the abrasive means backing 14e by means of a part-retention device 32e. The part-retention device 32e is formed as a porous scatter carpet having pattern formed of catch surfaces 34e and through-openings 36e. The abrasive particles 12e, which can be electrically polarized, are lifted by an electric field 42e from a conveyor belt 54e in an electrostatic scattering method and are moved toward the abrasive means backing 14e. A layer formed from a binder is applied to the abrasive means backing 14e in order to fasten the abrasive particles 12e. In an active region of the electric field 42e the part-retention device 32e is arranged such that the abrasive particles 12e are also moved toward the part-retention device 32e. Abrasive particles 12e contacting the catch surfaces 34e are retained by the catch surfaces 34e, such that the free regions 38e on the abrasive means backing 14e are produced by the catch surfaces 34e. The abrasive means backing 14e is formed as a continuous belt and is moved via a transport roller 40e. The part-retention device 32e is also moved and is adapted in terms of speed to the moved abrasive means backing 14e, such that the free regions 38e are retained in the scattering process. Abrasive particles 12e that have contacted the catch surfaces 34e fall back onto the conveyor belt 54e after leaving the active region of the electric field 42e and can be re-used.

Figure 21:
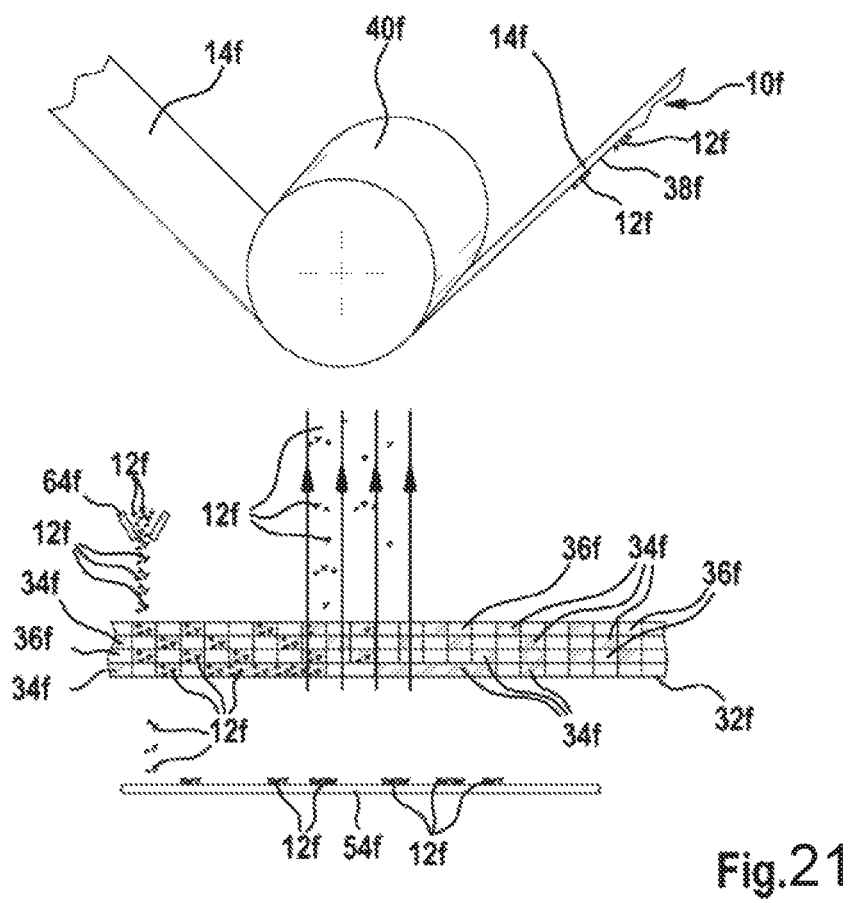
FIG. 21 shows a sixth alternative of a method according to the invention, in which individual free regions are obtained purposefully in an electrostatic scattering process by means of a part-retention device in that abrasive particles scattered only over defined places of the part-retention device are guided to an electrostatic scattering.

In a sixth alternative embodiment of a method according to the invention for applying abrasive particles 12f to an abrasive means backing 14f, in which abrasive particles 12f are purposefully placed on the abrasive means backing 14f, the abrasive particles 12f are heaped by means of a pouring device 64f onto a part-retention device 32f (FIG. 21). The part-retention device 32f is formed as a porous scatter carpet having a pattern formed from catch surfaces 34f and through-openings 36f, such that the abrasive particles 12f contacting the catch surfaces 34f can be transported on further and abrasive particles 12f contacting the through-openings 36f fall through the through-openings 36f onto a conveyor belt 54f and are transported away thereby. The part-retention device 32f is formed as a moving transport belt and transports the abrasive particles 12f in an active region of an electric field 42f, by which the abrasive particles 12f, which can be electrically polarized, are conveyed toward the abrasive means backing 14f, against the effect of the force of gravity. The abrasive means backing 14 is coated with a layer formed from a base binder, such that contacting abrasive particles 12f are retained. Free regions 38 are purposefully obtained on the abrasive means backing 14f by means of the through-openings 36f of the part-retention device 32f.

Figure 22:
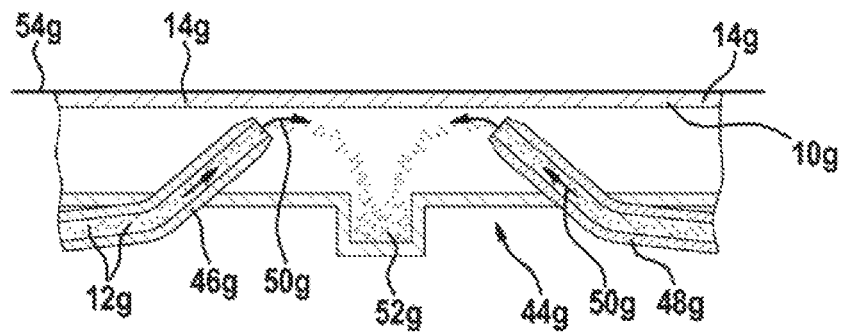
FIG. 22 shows a seventh alternative method according to the invention, in which the abrasive particles are purposefully placed on an abrasive means backing by means of a shaft loading device.
Figure 24:
FIG. 24 shows an abrasive particle that has been purposefully placed on the abrasive means backing using the shaft loading device and that is coated with adhesive on a support face prior to a transport in the shaft loading device.

FIG. 22 shows a seventh alternative method according to the invention for applying abrasive particles 12g on an abrasive means backing 14g, in which abrasive particles 12g are purposefully placed on the abrasive means backing 14g. The abrasive particles 12g are purposefully placed on an abrasive means backing 14g by means of a shaft loading device 44g. The abrasive particles 12g are guided in two transport shaft units 46g, 48g, in each case in transport flows 50g by means of compressed air. The transport shaft units 46g, 48g each comprise a guide channel having a bend, wherein a mouth of the guide channel is arranged at an angle relative to a ground surface, said angle being different from a right angle. Abrasive particles 12g exiting from the mouth of the guide channel are thus guided partially against the force of gravity, whereby a shaft in which the abrasive particles 12g are guided is formed. The abrasive particles 12g contact the abrasive means backing 14g at a point of reversal of the shafts, said abrasive means backing being guided by means of a conveyor belt 54g, such that the abrasive particles 12g are applied to the abrasive means backing 14g at this place. The abrasive particles 12g are coated with adhesive 58g on a support face 56g before being transported in the shaft loading device 44g, such that said particles remain adhered on the abrasive means backing 14g merely in a predefined orientation (FIG. 24). In alternative, simplified method, the abrasive means backing 14g is provided with a base binder layer, and the abrasive particles 12g are applied without adhesive coating. The abrasive particles 12g are thus applied to the abrasive means backing 14g in an orientation in which they have a maximum abrasive capacity. Abrasive particles 12g that do not remain adhered on the abrasive means backing 14g during the application fall as a result of the force of gravity into a particle collection point 52g, from which they can be introduced back into the transport shaft units 46g, 48g of the shaft loading device 44g. Impact points of the shafts of the two transport shaft units 46g, 48g of the shaft loading device 44g are displaced relative to one another in a transverse direction of the abrasive means backing 14g. Depending on a desired abrasive means 10g to be produced, additional transport shaft units 46g, 48g can be used, or just one of the transport shaft units 46g, 48g.

Figure 23:
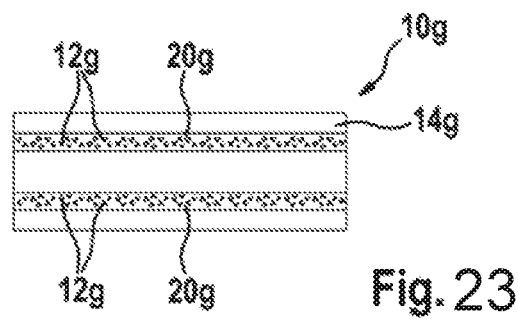
FIG. 23 shows an abrasive means produced using the shaft loading device.

An abrasive means 10g produced with the further alternative method according to the invention is illustrated in FIG. 23. By means of the two transport shaft units 46g, 48g, the abrasive particles 12g have been purposefully placed on the abrasive means backing 14g in two abrasive particle groups 20g formed as strips and arranged at a predefined distance from one another. In variants of the further alternative method according to the invention, mouths of the transport shaft units 46g, 48g are movable, such that the abrasive particles 12g can be purposefully placed on the abrasive means backing 14g in complicated patterns.

Figure 25:
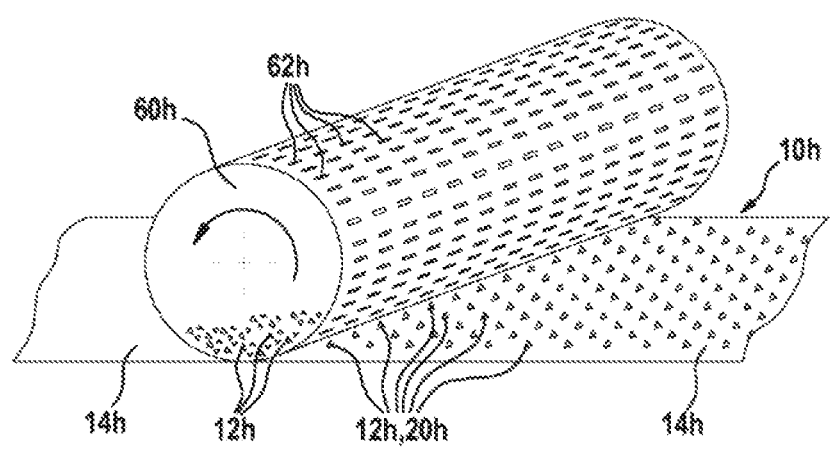
FIG. 25 shows an eighth alternative method according to the invention for applying abrasive particles to an abrasive means backing, in which the abrasive particles are placed purposefully by means of a roller.

An eighth alternative method according to the invention for applying abrasive particles 12h to an abrasive means backing 14h is illustrated in FIG. 25, in which alternative method the abrasive particles 12h are purposefully placed by means of a cylinder 60h. The abrasive particles 12h are guided in an abrasive particle fill in the cylinder 60h. The cylinder 60h has cylinder openings 62h in a predefined pattern, through which abrasive particles 12h fall onto the abrasive means backing 14h passed below the cylinder 60h during a revolution. The cylinder 60h may also have patterns of cylinder openings 62h different from the illustrated pattern, for example a spiral pattern. The abrasive particles 12h are thus placed purposefully in abrasive particle groups 20h, which are arranged at a predefined distance from one another, wherein a size of the abrasive particle groups 20h and a distance of the abrasive particle groups 20h from one another are given by a shape and an arrangement of the cylinder openings 62h in the cylinder 60h. The abrasive means backing 14h is covered by a layer formed from a binder, on which the abrasive particles 12h scattered by the cylinder openings 62h adhere. In order to complete a production of an abrasive means 10h, the abrasive particles 12h applied with the method according to the invention and arranged in the abrasive particle groups 20h are fastened to the abrasive means backing 14h by means of an additional layer formed from a top binder.

Figure 26:
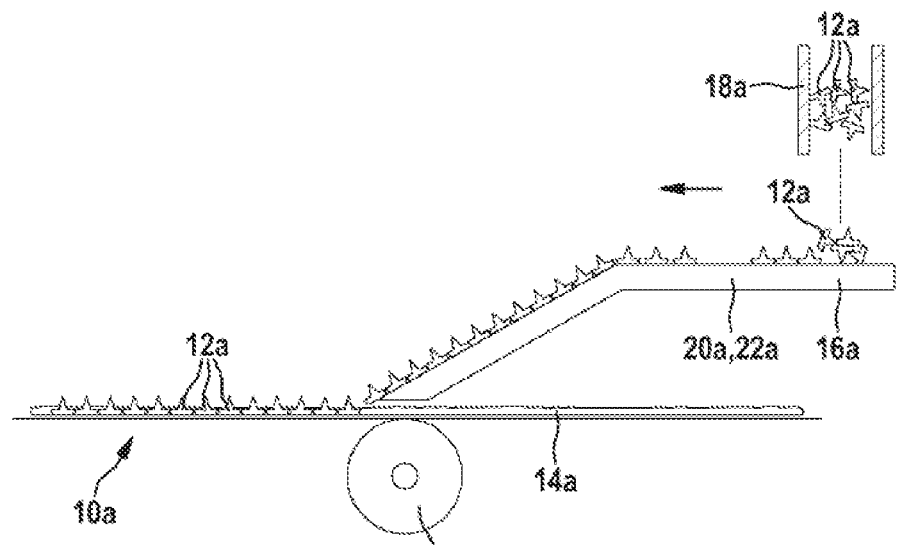
FIG. 26 shows a representation of a method according to the invention for producing an abrasive means, in which abrasive particles are scattered at least partially oriented by an orientation aid, which is formed integrally with a transport belt unit for the abrasive particles as vibration unit.

FIG. 26 shows a method according to the invention for producing an abrasive means 10a, in which abrasive particles 12a are scattered onto an abrasive means backing 14a. A device for carrying out the method according to the invention is illustrated here in a sectional view from a side. In accordance with the invention, the abrasive particles 12a are scattered at least partially oriented by an orientation aid 20a. The abrasive particles 12a are oriented here by the orientation aid 20a at least partially in a predefined scattering orientation prior to a scattering step. The orientation aid 20a is formed as a vibration unit 22a, by means of which the abrasive particles 12a are at least partially oriented. The abrasive particles 12a are at least partially oriented by the vibration unit 22a formed integrally with a transport belt unit 16a.

A fill of abrasive particles 12a, which have a form with a round support body with chamfered side faces and a pyramidal abrasive tip rising thereabove, is heaped onto a surface of the transport belt unit 16a via a pouring unit 18a. The illustrated form of the abrasive particles 12a is to be understood as exemplary for a number of possible forms. The method according to the invention is not limited to abrasive particles 12a having this form and can be used for abrasive particles 12a having a wide range of different forms. The supporting body has a support face facing away from the abrasive tip. By means of the vibration unit 22a, force pulses are introduced onto the abrasive particles 12a resting on the transport belt unit 16a. The introduced force pulses are dimensioned such that abrasive particles 12a resting via the support face on the surface of the transport belt unit 16a retain an orientation with respect to the force pulses and continue to rest via the support face on the surface of the transport belt unit 16a. Abrasive particles 12a resting with an orientation on the surface of the transport belt unit 16a deviating from a support via the support face and resting in particular on the surface of the transport belt unit 16a via the abrasive tip and an edge of the support face are deflected from their position and orientation by the force pulses and are brought into an orientation, in a manner assisted by a chamfering of the side faces of the support body, in which they rest via the support face on the surface of the transport belt unit 16*a*. The orientation in which the abrasive particles 12*a* rest via the support face on the surface of the transport belt unit 16*a* corresponds to the predefined scattering orientation, in which the abrasive particles 12*a* are applied to the abrasive means backing 14*a*. In the predefined scattering orientation, the abrasive particles 12*a* provide a scattering capacity. By means of the orientation aid 20*a*, the abrasive particles 12*a* are oriented to an extent of at least seventy percent in the predefined scattering orientation. The method according to the invention can also be used for abrasive particles 12*a* having other forms, wherein the other forms of the abrasive particles 12*a* must be such that the abrasive particles 12*a* have at least one support orientation with a much higher stability with respect to force pulses than orientations deviating therefrom.

The abrasive particles 12*a* partially oriented by the orientation aid 20*a* are scattered onto the abrasive means backing 14*a* using the transport belt unit 16*a*. The abrasive means backing 14*a* is formed as a large belt and is driven by drive rollers 30*a*, passed by a deflection end of the transport belt unit 16*a* at a short distance. The abrasive particles 12*a* are scattered onto the abrasive means backing 14*a* at the deflection end of the transport belt unit 16*a*, wherein, on account of a short distance of the deflection end of the transport belt unit 16*a* from the abrasive means backing 14*a*, the abrasive particles 12*a* are scattered onto the abrasive means backing 14*a* with the predefined scattering orientation. The abrasive means backing 14*a* is passed by below the transport belt unit 16*a* with an applied layer of adhesive, which is referred to as a base binder, such that the abrasive particles 12*a* are fixed directly during the scattering. In further process steps (not illustrated), the abrasive particles 12*a* are fastened on the abrasive means backing 14*a* using at least one further layer of adhesive, which is referred to as a top binder. The abrasive means 10*a* is then divided into smaller abrasive means 10*a*. Alternatively, the abrasive particles 12*a* could also be applied to an abrasive means backing 14*a* free from base binder and then fastened to the abrasive means backing 14*a* by means of one or more layers of adhesive.

Figure 27:
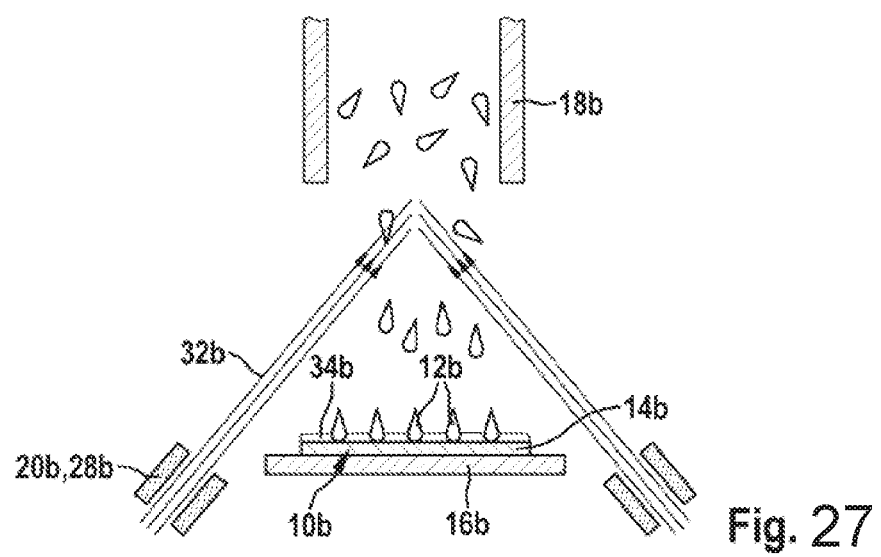
FIG. 27 shows a representation of an alternative exemplary embodiment of the method according to the invention, in which abrasive particles are scattered at least partially oriented by an orientation aid formed as an airflow unit.
Figure 28:
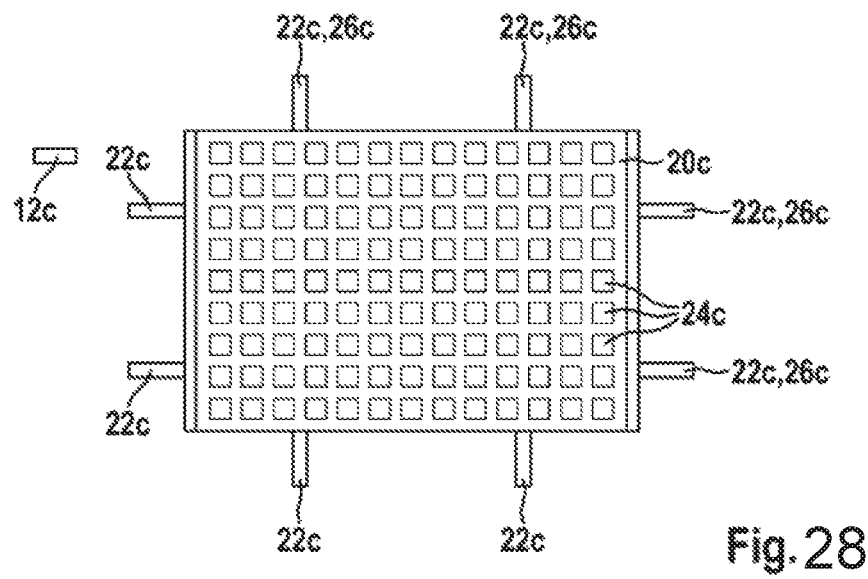
FIG. 28 shows a schematic representation of an orientation aid comprising screen openings for a further alternative exemplary embodiment of the method according to the invention in a plan view.
Figure 29:
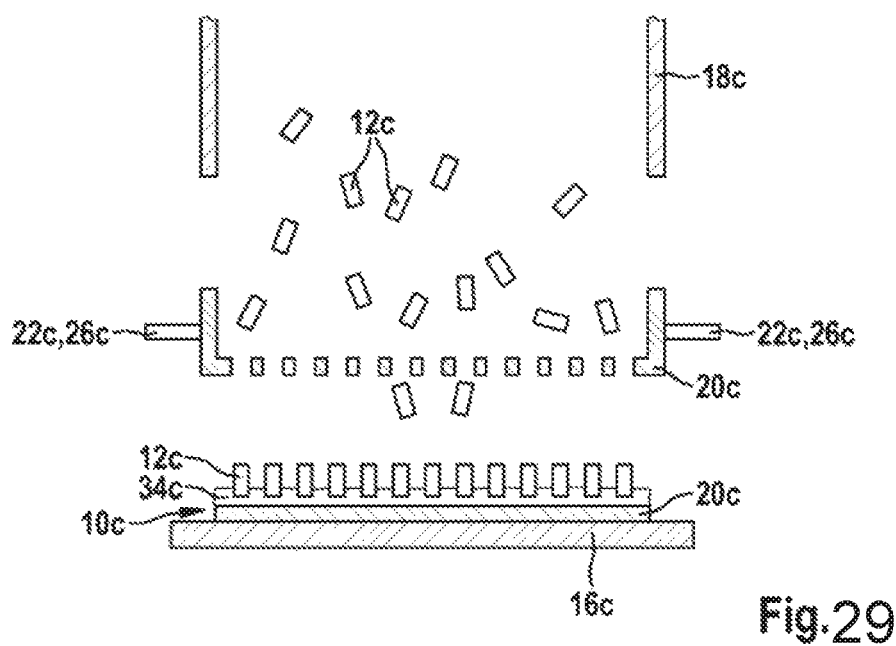
FIG. 29 shows a representation of the further alternative exemplary embodiment of the method according to the invention, in which abrasive particles are scattered at least partially oriented by the orientation aid comprising screen openings.

Two further exemplary embodiments of the invention are shown in FIGS. 27 to 29. The following description and the drawings are limited fundamentally to the differences between the exemplary embodiments, wherein, with respect to identically named components, in particular with respect to components having identical reference signs, reference is also made in principle to the drawings and/or the description of the other exemplary embodiments, in particular of FIG. 26. In order to distinguish between the exemplary embodiments, the letter a has been placed after the reference signs of the exemplary embodiment in FIG. 26. In the exemplary embodiments of FIGS. 27 to 29, the letter a has been replaced by the letters b to c.

FIG. 27 shows, in a schematic illustration, an alternative exemplary embodiment of the method according to the invention for producing an abrasive means 10*b*, in which abrasive particles 12*b* are scattered onto an abrasive means backing 14*b*, wherein the abrasive particles 12*b* are scattered at least partially oriented by an orientation aid 20*b*. The abrasive particles 12*b* are oriented at least partially in a scattering step by the orientation aid 20*b* formed as an airflow unit 28*b*. The airflow unit 28*b* has two nozzles for generating an airflow 32*b*, which are arranged on opposite sides of a transport belt unit 16*b*, on which the abrasive means backing 14*b* coated with adhesive 34*b* is guided. In principle, the airflow unit 28*b* may also have many more nozzles, for example a dozen or twenty nozzles, arranged opposite one another in pairs. A device for carrying out the method is illustrated in a sectional view, wherein a direction of transport of the transport belt unit 16*b* extends from a drawing plane toward a viewer. The abrasive particles 12*b* have a drop-shaped design and are oriented in a predefined scattering orientation by the airflows 32*b* of the airflow unit 28*b* in a scattering step. The method according to the invention is not limited to abrasive particles 12*b* having the presented design and can also be used for abrasive particles 12*b* having designs deviating from the drop shape. In the predefined scattering orientation, the abrasive particles 12*b* rest via a round side of the drop-shaped design on the abrasive means backing 14*b*, such that a pointed side of the drop-shaped design of the abrasive particles 12*b* acts as an abrasive tip, and the abrasive particles 12*b* achieve a maximum abrasive capacity. The abrasive particles 12*b* are scattered onto the abrasive means backing 14*b* via a pouring unit 18*b*, wherein they pass through a falling path, in which the airflows 32*b* of the airflow unit 28*b* cross. By means of a crossing of the airflows 32*b*, a force is exerted onto abrasive particles 12*b* located in an orientation deviating from the predefined scattering orientation, as a result of which force said abrasive particles are tipped into the predefined scattering orientation. The abrasive particles 12*b* are thus scattered onto the abrasive means backing 14*b* and fastened there by means of the adhesive 34*b* in the predefined scattering orientation, oriented by the orientation aid 20*b*.

In a further alternative exemplary embodiment of the method according to the invention for producing an abrasive means 10*c*, in which the abrasive particles 12*c* are scattered onto an abrasive means backing 14*c*, wherein the abrasive particles 12*c* are scattered at least partially oriented by an orientation aid 20*c*, the abrasive particles 12*c* are at least partially orientated in a scattering step by at least one orientation aid 20*c* comprising screen openings 24*c* (FIG. 29). In the method, a passage of the abrasive particles 12*c* through the screen openings 24*c* is at least assisted by a screening aid unit 26*c*. The abrasive particles 12*c* have a cuboidal shaping with a rectangular cross section. The method according to the invention is not limited to a use of abrasive particles 12*c* having the presented design. By way of example, abrasive particles 12*c* having a cylindrical design can be oriented by the orientation aid 20*c* comprising screen openings 24*c*. A use of further abrasive particles 12*c* of different design is also included within the scope of the method according to the invention, wherein the abrasive particles 12*c* must have a design in which they are retained by the screen openings 24*c* in at least one defined orientation. The screen openings 24*c* are selected from a size such that a passage of the abrasive particles 12*c* through the screen openings 24*c* in an orientation in which the abrasive particles 12*c* are oriented with a long side parallel to a plane of the orientation aid 20*c* is prevented (FIG. 28). The abrasive particles 12*c* can pass through the screen openings 24*c* merely in a predefined scattering orientation, in which short sides of the abrasive particle 12*c* are oriented parallel to the plane of the orientation aid 20*c*. The abrasive particles 12*c* are heaped by a pouring unit 18*c* onto the orientation aid 20*c*, which is arranged between the pouring unit 18*c* and the abrasive means backing 14*c*. Abrasive particles 12*c* that contact screen openings 24*c* in the predefined scattering orientation fall through these openings onto the abrasive means backing 14c and are fastened in this orientation by a layer of adhesive 34c applied previously to the abrasive means backing 14c. Abrasive particles 12c that contact the orientation aid 20c in an orientation deviating from the predefined scattering orientation and rest on said orientation aid are deflected from their positions by force pulses of the screening aid unit 26c, which is formed as a vibration unit 22c. The force pulses cause a shaking movement, as a result of which the abrasive particles 12c are moved over a surface of the screening aid unit 26c. The size of the screen openings 24c and an extension of intermediate regions between the screen openings 24c is selected such that the abrasive particles 12c are moved with a high likelihood, with a movement produced by the shaking movement of the orientation aid 20c, into positions in which they rest with a center of gravity above a screen opening 24c and tilt as a result of a gravity effect into the predefined scattering orientation, in which they fall through screen openings 24c. On account of a selected short distance between the orientation aid 20c and the abrasive means backing 14c, the abrasive particles 12c that fall through the screen openings 24c reach the abrasive means backing 14c in the predefined scattering orientation, since a path between the orientation aid 20c and the abrasive means backing 14c is too short to allow a rotation of the abrasive particles 12c from the predefined scattering orientation.

Figure 30:
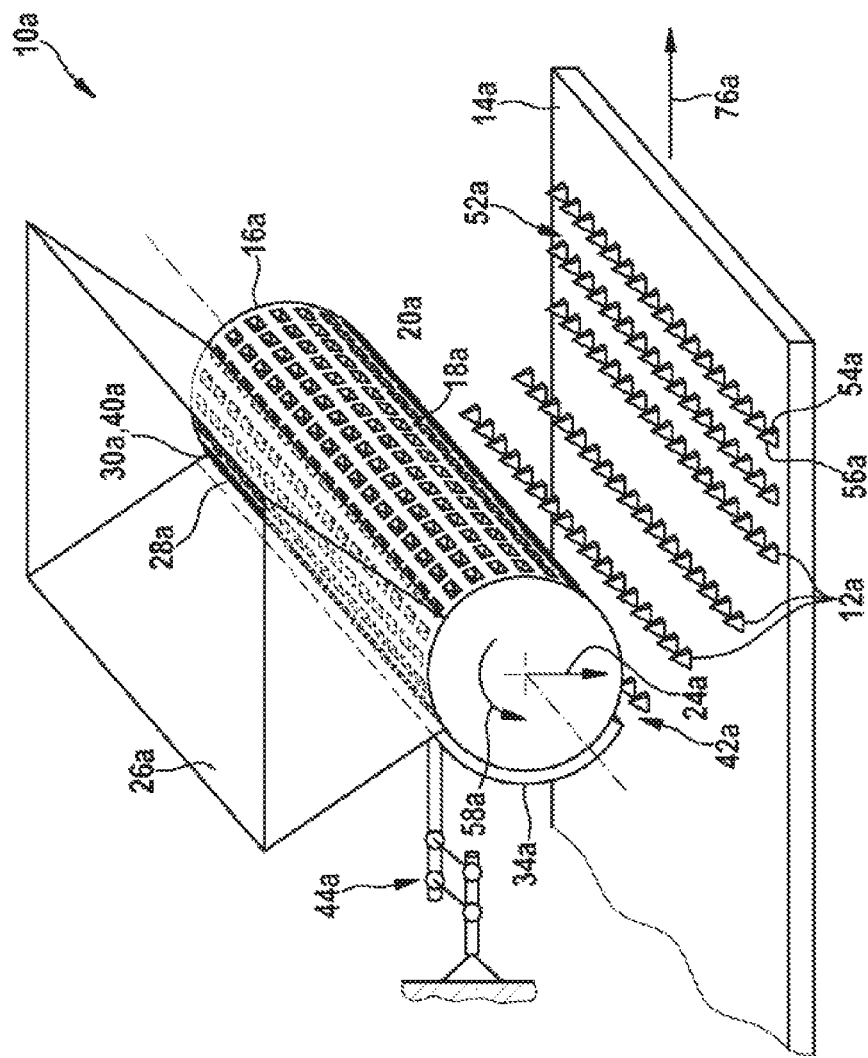
FIG. 30 shows a schematic representation of a device according to the invention for applying abrasive particles.

FIG. 30 shows a device 10a for applying abrasive particles 12a to an abrasive means backing 14a for forming an abrasive means 52a. The device 10a has an abrasive particle feed cylinder 16a, which on a lateral face 18a has recesses 20a, which are each intended to receive an abrasive particle 12a. The abrasive particle feed cylinder 16a is intended to the abrasive particles 12a in the direction of the force of gravity 24a in a defined arrangement 22a on the abrasive means backing 14a moved past below the abrasive particle feed cylinder in a direction of transport 76a.

The abrasive particles 12a are formed as tetrahedrons 54a and are placed in the arrangement 22a via their tetrahedral faces onto the abrasive means backing 14a coated with a binder. The tetrahedral edges 56a form chip edges of the abrasive particles 12a. The device 10a according to the invention can be used for abrasive particles 12a having different geometries, such that the specified tetrahedral geometry is to be understood as exemplary.

Figure 31:
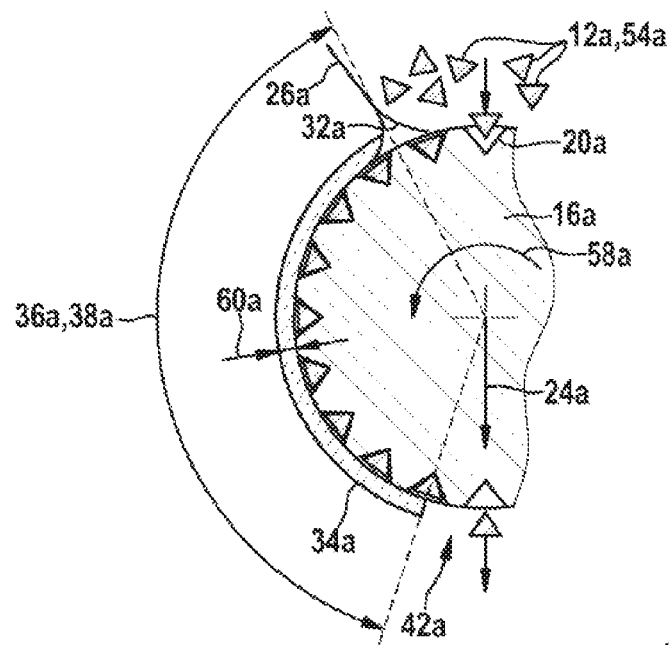
FIG. 31 shows a schematic representation of a detail of an abrasive particle feed cylinder having a stripping element and a retaining unit.
Figure 32:
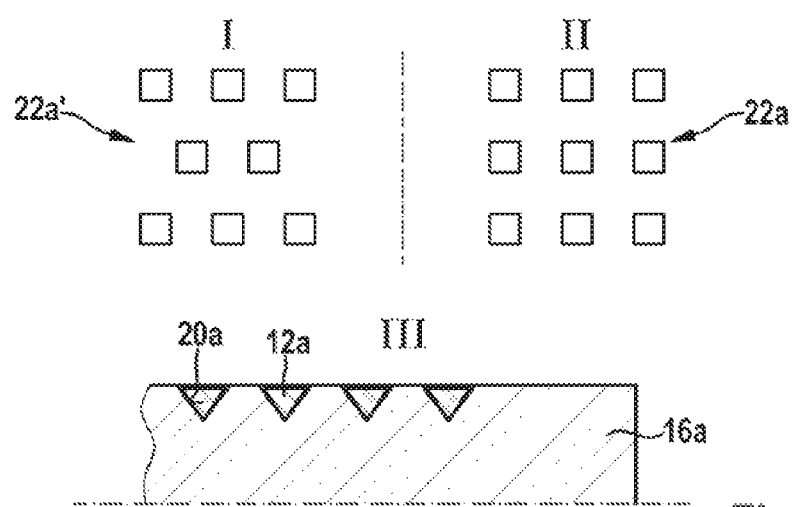
FIG. 32 shows a schematic representation of recesses of the abrasive particle feed cylinder and defined abrasive particle arrangements.

The recesses 20a have a shape complementary to the geometry of the abrasive particles 12a (FIG. 31 and FIG. 32-III). Inner faces of the recesses 20a each form three faces of a hollow tetrahedron, which in each case receives an abrasive particle 12a.

The recesses 20a may alternatively also be formed differently, for example as a hollow cone. In particular, the recesses 20a may have a shape that is not complementary to the geometry of the abrasive particles 12a. The recesses 20a have an oversize compared with the abrasive particles 12a, which is set by a person skilled in the art, of 10-40% in order to avoid a wedging of the abrasive particles 12a. The recesses 20a are arranged on the lateral face 18a in regular rows, such that the abrasive particles 12a are deposited in the arrangement 22a shown in FIG. 32-II. Alternatively, deviating arrangements 22a' are also possible, for example offset rows as shown in FIG. 32-I.

An abrasive particle storage container 26a is arranged above the abrasive particle feed cylinder 16a with respect to a direction of the force of gravity 24a and has an opening 28a for a heaping of the abrasive particles 12a onto a portion 30a of the lateral face 18a of the abrasive particle feed cylinder 16a. In FIG. 30 a shape of the abrasive particle storage container 26a and of the portion 30a of the lateral face 18a of the abrasive particle storage container 26a is illustrated transparently for reasons of improved visibility. The opening 28a ends with a narrow gap from the lateral face 18a in order to prevent abrasive particles 12a not received by the recesses 20a from being able to exit between the abrasive particle storage container 26a and the abrasive particle feed cylinder 16a. The portion 30a extends over an entire width of the abrasive particle feed cylinder 16a comprising the recesses 20a. The recesses 20a move along a cylinder direction 58a below the opening 28a and each receive an abrasive particle 12a. The portion 30a here forms an abrasive particle take-over region 40a.

The abrasive particles 12a, during the transport process, sweep over a lateral cylinder face 38a. A stripping element 32a formed as a brush strips off abrasive particles 12a resting on the lateral face 18a outside the recesses 20a when these particles leave the abrasive particle take-over region 40a. A retaining unit 34a covers a portion 36a of the lateral cylinder face 38a from the abrasive particle take-over region 40a to an abrasive particle dispensing region 42a, in which the abrasive particles 12a are dispensed onto the abrasive means backing 14a. The retaining unit 34a is formed in the illustrated exemplary embodiment as a sheet metal piece having a cylindrical inner face, which covers the lateral face 18a in the portion 36a at a short distance 60a. The distance 60a is selected such that the abrasive particles 12a cannot fall from the recesses 20a, such that particle size tolerances due to size deviations of the abrasive particles 12a caused by a production method of the abrasive particles 12a are taken into account, and such that a wedging of the abrasive particle feed cylinders 16a with the retaining unit 34a is avoided. The location of the abrasive particle dispensing region 42a can be influenced by a suitable selection of the length of the portion 36a and therefore of the retaining unit 34a over the rolling direction 58a. Furthermore, the application of the abrasive particles 12a to the abrasive means backing 14a can be influenced by a distance of the abrasive particle feed cylinder 16a from the abrasive means backing 14a and a rotational speed of the abrasive particle feed cylinder 16a and also a diameter of the abrasive particle feed cylinder 16a.

In order to assist the receiving and the dispensing of the abrasive particles 12a, a vibration device 44a is provided, which sets in vibration the abrasive particle feed cylinder 16a with the abrasive particle storage container 26a. Due to the vibration, a wedging of the abrasive particles 12a during the dispensing is avoided. In the case of the receiving, the abrasive particles 12a move chaotically as a result of the vibration, such that abrasive particles 12a are oriented with a higher likelihood such that they can be received by the recesses 20a. A vibration frequency is set such that the vibration particularly advantageously assists the receiving and dispensing of the abrasive particles 12a.

Figure 33:
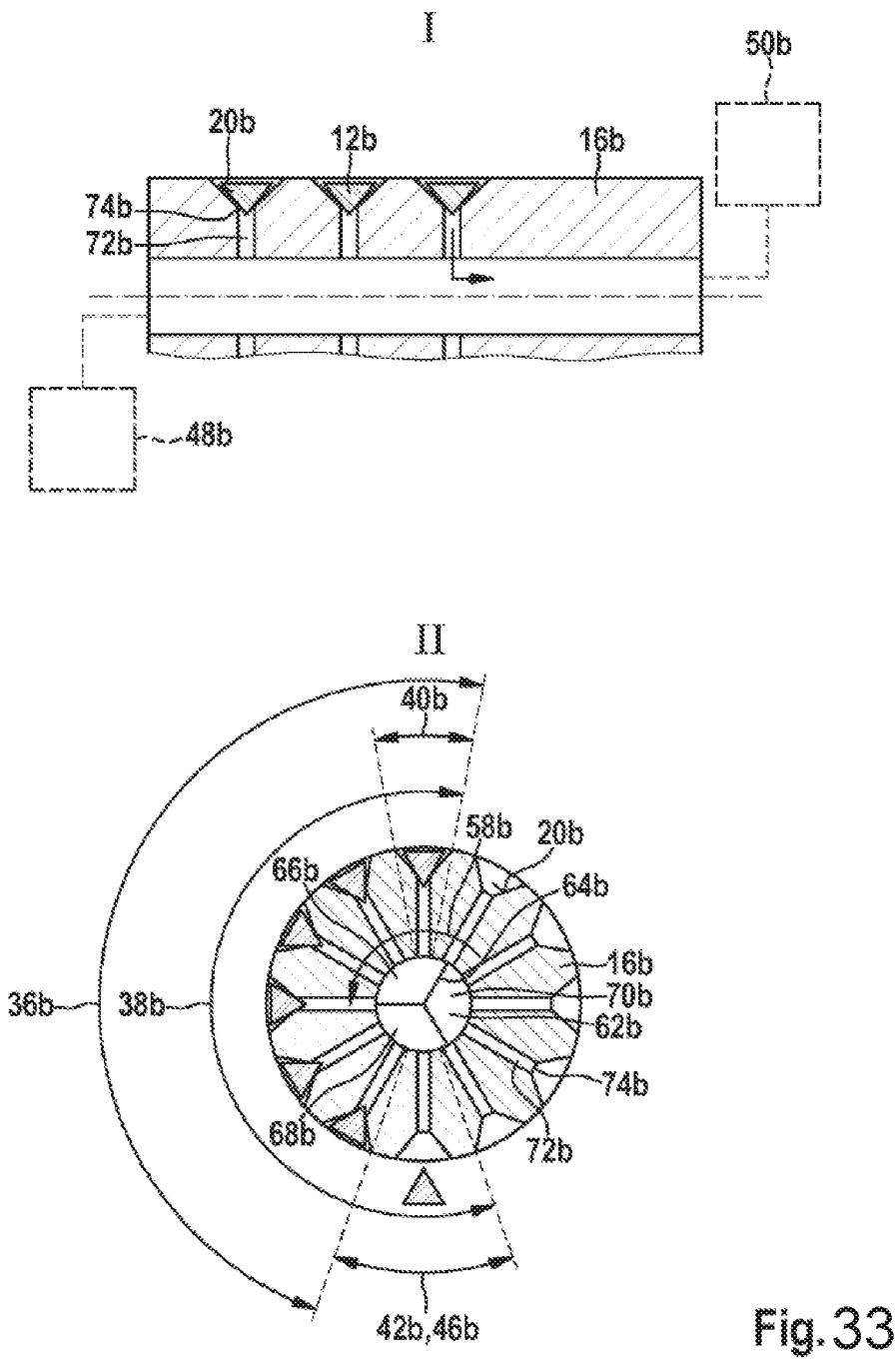
FIG. 33 shows a schematic representation of an abrasive particle feed cylinder of a device according to the invention with a negative pressure and/or an overpressure source in a second exemplary embodiment.

A further exemplary embodiment of the invention is shown in FIG. 33. The following description and the drawing are limited fundamentally to the differences between the exemplary embodiments, wherein, with respect to identically named components, in particular with respect to components having identical reference signs, reference is also made in principle to the drawing and/or the description of the other exemplary embodiment. In order to distinguish between the exemplary embodiments, the letter a has been placed after the reference signs of the exemplary embodiment in FIGS. 30 to 32. In the exemplary embodiment of FIG. 33, the letter a has been replaced by the letter b.

In FIGS. 33-I and 33-II an abrasive particle feed cylinder 16*b* of a device 10*b* for applying abrasive particles 12*b* in a second exemplary embodiment is shown. The device 10*b* differs from the device 10*a* in particular in that an overpressure source 48*b* is connected in a portion 46*b* of a lateral cylinder face 38*b* to recesses 20*b* during operation of the device 10*b*. The overpressure source 48*b* is intended to dispense the abrasive particles 12*b* from the recesses 20*b* by applying an overpressure, which exceeds an ambient pressure. A negative pressure source 50*b* is also connected in a further portion 36*b* of the lateral cylinder face 38*b* to recesses 20*b*. The negative pressure source 50*b* is intended to fix the abrasive particles 12*b* in the recesses 20*b* by applying a pressure that is reduced compared with an ambient pressure. In principle, the device 10*b* in an alternative embodiment may also have only the overpressure source 48*b* or the negative pressure source 50*b*.

The abrasive particle feed cylinder 16*b* in its center has a hollow cylinder 62*b*, which is divided by a star-shaped seal element 64*b* into three hollow cylinder segments 66*b*, 68*b*, 70*b*. The first hollow cylinder segment 66*b* connected to the negative pressure source 50*b* extends about a cylinder axis of the abrasive particle feed cylinder 16*b* in a rolling direction 58*b* from an abrasive particle take-over region 40*b* to the start of an abrasive particle dispensing region 42*b*. The second hollow cylinder segment 68*b* connected to the overpressure source 48*b* extends about the cylinder axis in the rolling direction 58*b* along the abrasive particle dispensing region 42*b*. The third hollow cylinder segment 70*b* extends about the cylinder axis in the rolling direction 58*b* from the end of the abrasive particle dispensing region 42*b* to the start of the abrasive particle take-over region 40*b* and is acted on by ambient pressure. Pressure connections 72*b* arranged in a star-shaped manner lead from the hollow cylinder 62*b* and are connected via openings 74*b* to the recesses 20*b*. The recesses 20*b* are thus acted on by the negative pressure in the rolling direction 58*b* from the abrasive particle take-over region 40*b* to the start of the abrasive particle dispensing region 42*b* and are acted on by the overpressure in the abrasive particle dispensing region 42*b*. A pressure application is absent in the rolling direction from the end of the abrasive particle dispensing region 42*b* to the start of the abrasive particle take-over region 40*b* in order to avoid unnecessary pressure and energy losses. In this embodiment it is also possible to dispense with further means, such as the retaining unit 34*a* and the vibration device 44*a* of the first exemplary embodiment for assisting the receiving and the dispensing and also for securing the abrasive particles 12*b*. The receiving and dispensing of the abrasive particles 12*b* can be influenced by a suitable setting of the overpressure and of the negative pressure.

Figure 34:
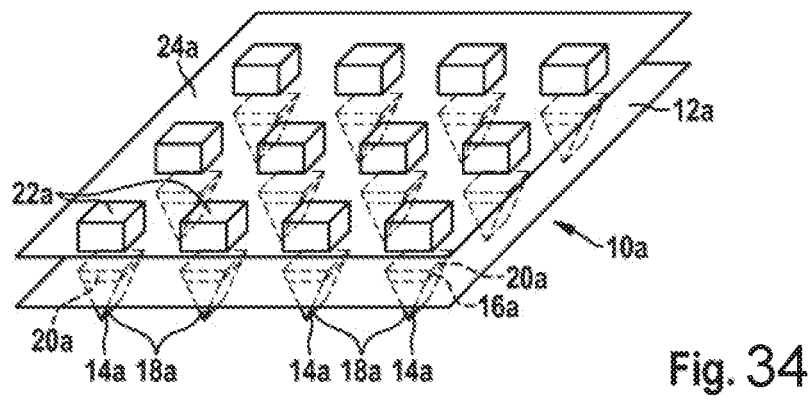
FIG. 34 shows a representation of the functional principle of the method according to the invention for producing an abrasive means, comprising at least one heaping step, in which abrasive particles are heaped onto an abrasive means backing, in which abrasive particles are oriented and fixed on the abrasive means backing by means of magnets.

FIG. 34 shows a schematic sketch of a method step of a method according to the invention for producing an abrasive means 10*a*, which method comprises a heaping step, in which abrasive particles 14*a* are heaped onto an abrasive means backing 12*a*, wherein the abrasive particles 14*a* are oriented by means of an electromagnetic field during and/or after the at least one heaping step. The electromagnetic field is formed as a magnetic field and is generated by magnets 22*a* formed as permanent magnets, which are arranged on a carrier unit 24*a* formed separately from the abrasive means backing 12*a*. The abrasive particles 14*a* are oriented during a last sub-step of the heaping step by the electromagnetic field as soon as they enter a vicinity of the magnets 22*a*. The abrasive particles 14*a* are fixed by means of the magnets 22*a* on the abrasive means backing 12*a* and are fastened in order to finish the abrasive means 10*a* by means of a layer formed from a base binder and a following layer formed from a top binder. The magnets 22*a* produce, on the abrasive means backing 12*a*, discrete abrasive points formed from fixed abrasive particles 14*a*, between which regions that are free from abrasive particles 14*a* are formed on the abrasive means backing 12*a*. In FIG. 34, for reasons of clarity, each magnet 22*a* is associated with one abrasive particle 14*a*, however, on account of a small size of the abrasive particles 14*a*, each magnet 22*a* is in principle associated with a group of a plurality of oriented abrasive particles 14*a*, which are oriented and fixed by the magnet 22*a*.

Figure 36:
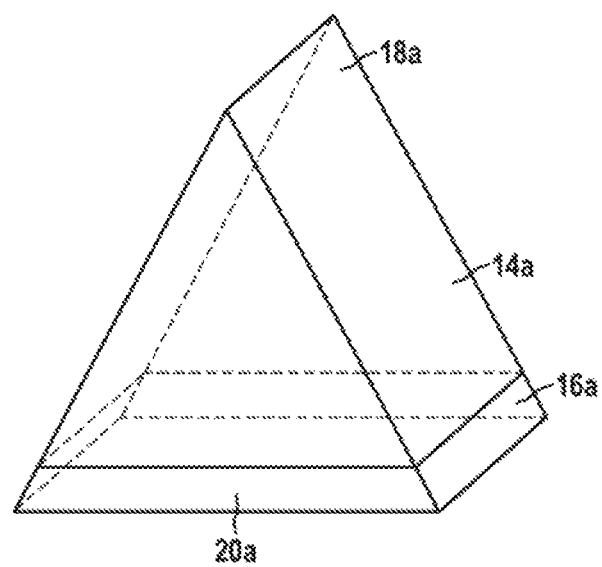
FIG. 36 shows a detailed representation of an abrasive particle used in the method according to the invention.

In a method step for producing an abrasive particle 14*a*, an abrasive particle intermediate product is provided in part with an electromagnetically effective coating 16*a* (FIG. 36). The abrasive particle intermediate product is formed by a sintered body of an abrasive particle 14*a* made of aluminum oxide, which body is finished apart from a missing coating 16*a*. The electromagnetically effective coating 16*a* is formed by a paramagnetic coating 16*a*. The electromagnetically effective coating 16*a* is applied to a support side 20*a* of the abrasive particle 14*a*. The support side 20*a* has a rectangular basic shape, from which four side faces extend, of which a first pair of opposite side faces have a rectangular basic shape and a second pair of opposite side faces have a triangular basic shape. The side faces converge in an edge of an abrasive side 18*a*. The method according to the invention can be used for abrasive particles 14*a* having arbitrary defined or undefined geometries, wherein the abrasive particles 14*a* preferably have a support side 20*a* and at least one abrasive side 18*a* different from the support side 20*a*.

Figure 35:
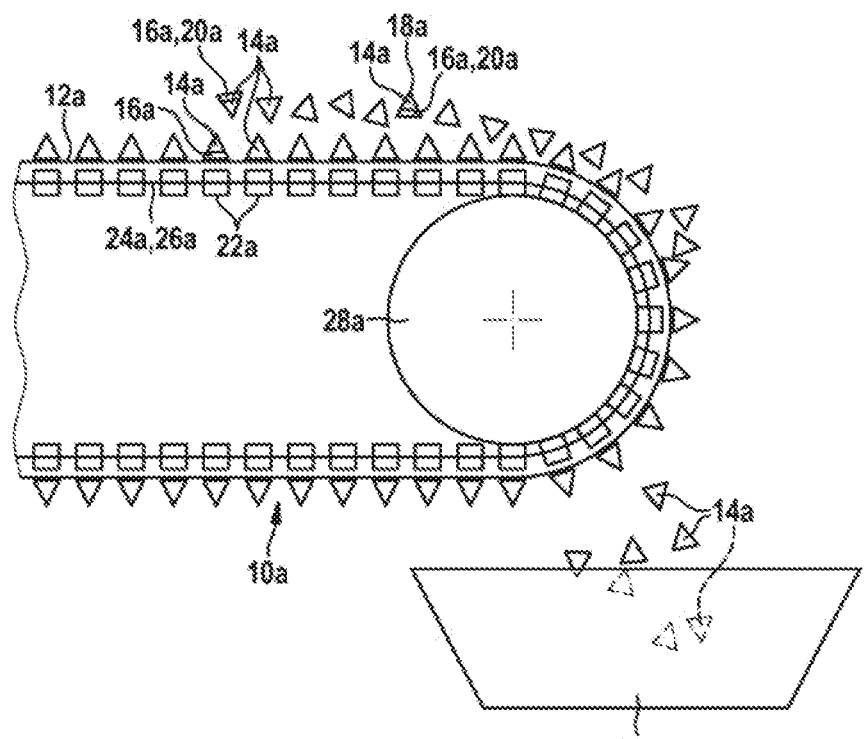
FIG. 35 shows a method step of the method according to the invention, comprising a separation step for unfixed abrasive particles.

The abrasive particles 14*a* are scattered onto the abrasive means backing 12*a* in order to produce the abrasive means 10*a*, which abrasive means backing is guided as a continuous belt on a transport belt 26*a* (FIG. 35). The abrasive particles 14*a* are oriented by means of magnets 22*a* arranged on the carrier unit 24*a* formed as a transport belt 26*a* and are fixed on the abrasive means backing 12*a*. Some of the abrasive particles 14*a* are attracted during a scattering via their support side 20*a* by the electromagnetic field of the magnets 22*a*, said support side being coated by the electromagnetically effective coating 16*a*, such that these abrasive particles 14*a* come to rest in an oriented manner via their support side 20*a* on the abrasive means backing 12*a*. With a shaking process, by means of which a slight vibration is introduced onto the abrasive means backing 12*a*, a deflection of abrasive particles 14*a* resting in part via the abrasive side 18*a* on the abrasive means backing 12*a* can be effected, such that these particles can be oriented by the magnets 22*a*. The abrasive particles 14*a* scattered in a spatial vicinity of the magnets 22*a* over the abrasive means backing 12*a* are fixed hereby. A fixing of abrasive particles 14*a* takes place in a radius, predefined by a magnetic field strength, about a projection of the magnet 22*a* onto the abrasive means backing 12*a*, such that a discrete abrasive point is formed from fixed and oriented abrasive particles 14*a*. A further portion of scattered abrasive particles 14*a* comes to rest on regions of the abrasive means backing 12*a* in which a magnetic field strength of the magnets 22*a* that is insufficient for fixing is effective, such that the abrasive particles 14*a* come to lie in a random orientation and are unfixed. In a separation step, the unfixed abrasive particles 14*a* are removed from the abrasive means backing 12*a*, wherein the unfixed abrasive particles 14*a* are separated by means of a separation method based on the force of gravity. The abrasive means backing 12*a* is rotated here by means of a deflection roller 28*a*, such that a side with the scattered abrasive particles 14*a* faces a ground surface. In so doing, unfixed abrasive particles 14*a* fall away from the abrasive means backing 12*a* and are caught in a catch unit 30*a*, such that they can be fed back to a scattering process on the abrasive means backing 12*a*. Once the separation method based on the force of gravity has been performed, the oriented and fixed abrasive particles 14*a* are fastened to the abrasive means backing 12*a* by means of a first layer formed from a base binder and a second layer formed from a top binder. The abrasive means backing 12*a* with the fastened, oriented abrasive particles 14*a* is then cut into individual abrasive means 10*a* and removed from the transport belt 26*a*.

Figure 37:
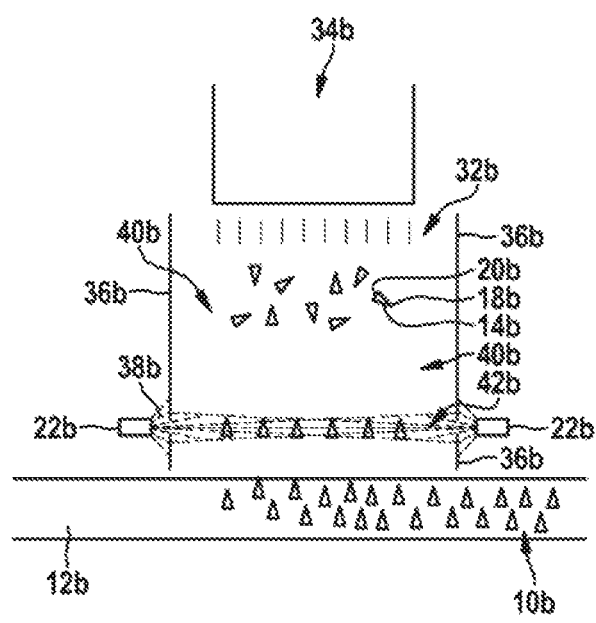
FIG. 37 shows an alternative method for producing an abrasive means, in which abrasive particles are poured along a falling path and are oriented in a slot-like active region of an electromagnetic field.

A further exemplary embodiment of the invention is shown in FIG. 37. The following descriptions and the drawings are limited fundamentally to the differences between the exemplary embodiments, wherein, with respect to identically named components, in particular with respect to components having identical reference signs, reference is also made in principle to the drawings and/or the description of the other exemplary embodiments, in particular of FIGS. 34 to 36. In order to distinguish between the exemplary embodiments, the letter a has been placed after the reference signs of the exemplary embodiment in FIGS. 34 to 36. In the exemplary embodiment of FIG. 37, the letter a has been replaced by the letter b.

FIG. 37 shows an alternative method according to the invention for producing an abrasive means 10*b*, comprising at least one heaping step, in which abrasive particles 14*b* are heaped onto an abrasive means backing 12*b*, wherein the abrasive particles 14*b* are oriented by means of an electromagnetic field during the heaping step. A first layer formed from a base binder is applied to the abrasive means backing 12*b* in order to fix scattered abrasive particles 14*b*. The abrasive particles 14*b* are partially oriented here along a falling path 32*b* by the electromagnetic field. The abrasive particles 14*b*, for partial orientation, pass through at least one screening region 40*b* of the falling path 32*b*, which region is screened from the electromagnetic field, and a slot-like active region 42*b* of the falling path 32*b*, which region is arranged at a short distance from the abrasive means backing 12*b*. The abrasive particles 14*b* are heaped from an abrasive particle pouring unit 34*b* and pass through the falling path 32*b*. Magnets 22*b* are arranged laterally of the falling path 32*b* and generate an electromagnetic field. A screening unit 36*b* comprising screening elements formed from a soft-magnetic material with a high permeability screens screening regions 40*b* of the falling path 32*b* from the electromagnetic field of the magnets 22*b*. A slot 38*b* in the screening unit 36*b* generates the slot-like active region 42*b* of the falling path 32*b*.

The abrasive particles 14*b* have a cross section in the form of a triangle tapering into an acute angle, with an abrasive side 18*b* and a support side 20*b*, wherein the support side 20*b* is formed by the base of the triangle tapering into an acute angle. The abrasive particles 14*b* additionally have a magnetic dipole moment, wherein one pole is arranged in the support side 20*b* and another pole is arranged in the abrasive side 18*b*. When passing through the slot-like active region 42*b*, the abrasive particles 14*b* are oriented such that they come to lie via the support side 20*b* on the abrasive means backing 12*b*. Due to a short distance between the slot-like active region 42*b* and the abrasive means backing 12*b*, merely a small proportion of the abrasive particles 14*b* oriented in the slot-like active region 42*b* loses an orientation given in the slot-like active region 42*b*, such that a large proportion of the abrasive particles 14*b* are placed in the oriented state on the abrasive means backing 12*b*. Once the oriented abrasive particles 14*b* have been scattered onto the abrasive means backing 12*b*, the abrasive particles 14*b* are fastened to the abrasive means backing 12*b* by means of a second layer formed from a top binder, and the abrasive means backing 12*b* with the fastened abrasive particles 14*b* is then divided into individual abrasive means 10*b*.

Figure 38:
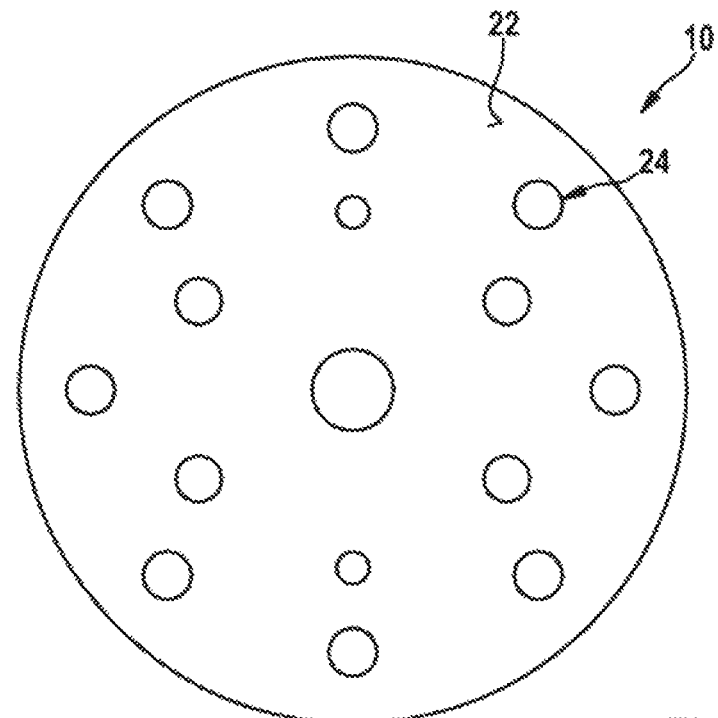
FIG. 38 shows an abrasive means of a method according to the invention.

FIG. 38 shows an abrasive means 10 produced using the method according to the invention. The abrasive means is formed as an abrasive disk for a random orbit sander (not illustrated). The abrasive means 10 has an abrasive face 22 occupied by abrasive particles 16. The abrasive face 22 is substantially flat. The abrasive face 22 delimits openings 24 in the abrasive face 22, through which the random orbit sander abrasive dust can be suctioned.

Figure 39:
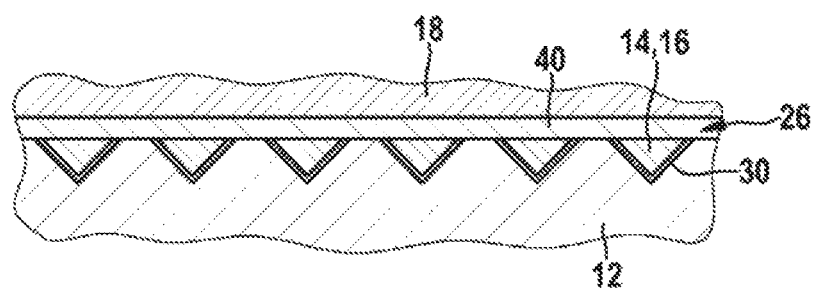
FIG. 39 shows a partial section of the abrasive means from FIG. 38 and a partial section of the shaping means of the method according to the invention.

FIG. 39 shows a shaping means 12 for producing and positioning the abrasive particles 16 of the abrasive means 10. The shaping means 12 has cavities 14 delimited on a shaping face 26. The shaping face 26 has an extension that corresponds substantially to an extension of the abrasive face 22. The shaping means 12 delimits the cavities 14, which each substantially have a target shape of the abrasive particles 16.

Figure 40:
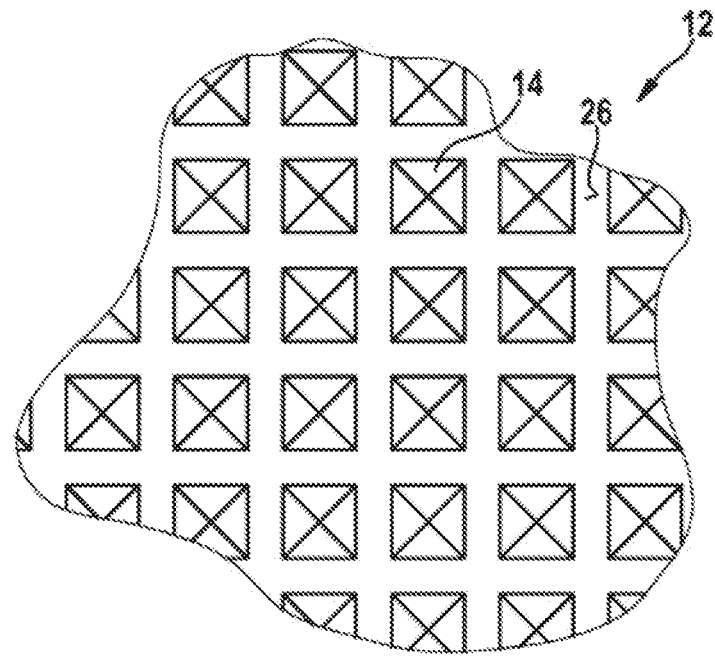
FIG. 40 shows an arrangement of abrasive particles of the abrasive means from FIG. 38.

As shown in FIG. 40, the cavities 14 are arranged systematically in a plane spanned by the shaping face 26. Here, the cavities 14 are arranged substantially regularly in a portion of the shaping face 26. Alternatively, cavities of a shaping means could be formed in the shaping means in any other arrangement appearing expedient to a person skilled in the art.

Figure 41:
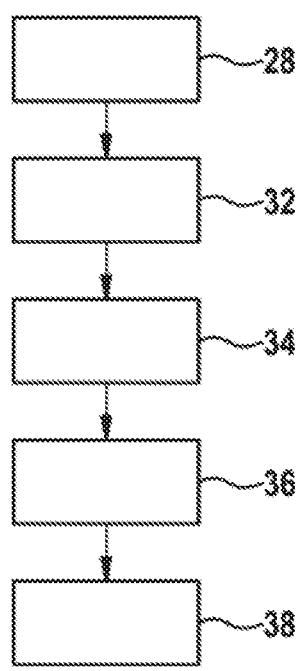
FIG. 41 shows method steps of the method according to the invention.

FIG. 41 shows the method according to the invention for producing an abrasive means 10. In a first method step 28 a partition means 30 is applied to the shaping face 26. The partition means 30 prevents the abrasive particles 16 from bonding to the shaping means 12. Alternatively, a shaping means could be formed and/or coated in such a way that the abrasive particles 16 do not bond to the shaping means.

In a next method step 32, a dispersion of the abrasive particles 16 for shaping the abrasive particles 16 is introduced into the cavities 14. Excess dispersion is removed by doctor blades. Alternatively, excess dispersion could be removed in another way appearing expedient to a person skilled in the art. The dispersion of the abrasive particles 16 is then dried in a further method step 34. In a next method step 36, the abrasive particles 16 are sintered in the cavities 14 of the shaping means 12. The shaping means 12 is heated for this purpose.

In a next method step 38, an abrasive particle carrier 18 and/or the abrasive particles 16 is/are coated with a base binder 40. In a further method step 38, the abrasive particles 16 are applied to the abrasive particle carrier 18 of the abrasive means 10 illustrated in FIG. 39. Here, the abrasive particle carrier 18 is formed integrally with an abrasive means backing 20 of the abrasive means 10. Alternatively, an abrasive particle carrier and an abrasive means backing could be interconnected in at least one method step, in particular before or after an application of the abrasive particles 16.

When applying the abrasive particles 16 to the abrasive particle carrier 18, the abrasive particles 16 are placed in an arrangement on the abrasive particle carrier 18 of the abrasive means 10, which arrangement is given by an arrangement of the cavities 14 in the shaping means 12. The shaping means 12 and the abrasive particle carrier 18 are then brought toward one another for the placement of the abrasive particles 16. Here, the shaping means 12 and the abrasive particle carrier 18 are pressed against one another. Alternatively, a shaping means and/or an abrasive particle carrier could be rolled. The base binder 40 connects the abrasive particles 16 to the abrasive particle carrier 18. When the shaping means 12 is distanced from the abrasive particle carrier 18, the abrasive particles 16 remain on the abrasive means 10.

Figure 42:
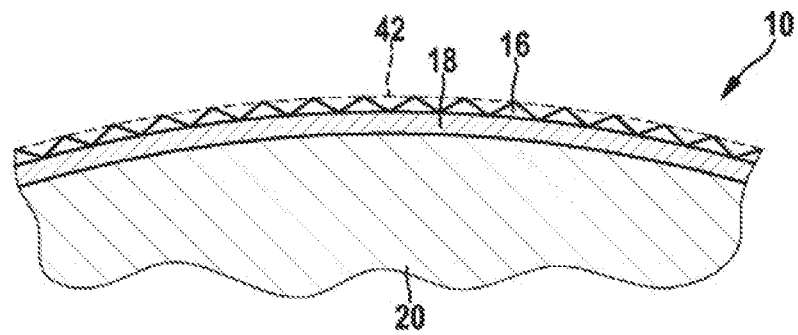
FIG. 42 shows a partial section of an abrasive means of an alternative method according to the invention.
Figure 43:
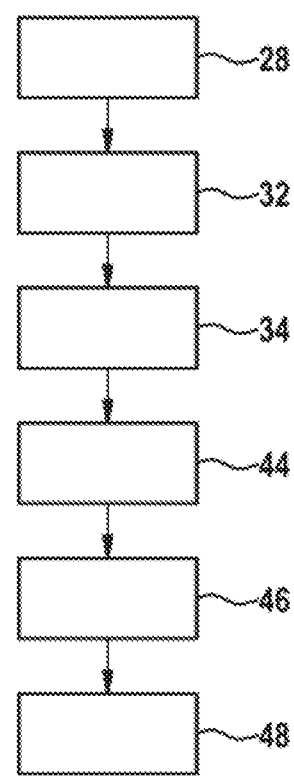
FIG. 43 shows method steps of the method according to the invention from FIG. 42.

A further exemplary embodiment of the invention is shown in FIGS. 42 and 43. The following descriptions and the drawing are limited fundamentally to the differences between the exemplary embodiments, wherein, with respect to identically named components, in particular with respect to components having identical reference signs, reference can also be made in principle to the drawing and/or the description of the other exemplary embodiments, in particular of figures 38 to 41.

FIG. 42 shows a partial section of a further abrasive means 10. An abrasive face 42 of the abrasive means 10 is curved. Here, the abrasive face 42 is formed in the manner of a lateral face. The method described here may also be used with differently shaped abrasive faces. An abrasive particle carrier 18 and an abrasive means backing 20 are separate from one another in the case of this abrasive means 10. The abrasive particle carrier is flexible. The abrasive means backing 20 is dimensionally stable. The abrasive particle carrier 18 can thus assume a shape of the abrasive means backing 20 when applied to the abrasive means backing 20.

In a first method step 28, as described in the first exemplary embodiment, a partition means is applied to a shaping means. In a further method step 32, a dispersion of abrasive particles 16 is then introduced into the shaping means in order to shape the abrasive particles 16. The dispersion of the abrasive particles 16 is dried in a next method step 34, such that abrasive particles 16 are produced in a green state. In a next method step 44, the abrasive particles 16 in the green state are applied from the cavities of the shaping means onto the abrasive particle carrier 18, in particular with addition of a base binder. In addition, base binder around the abrasive particles 16 could be removed in an intermediate step, whereby a strength of the abrasive particle carrier 18 can be increased. The abrasive particles 16 and the abrasive particle carrier 18 are then sintered jointly in a method step 46. The abrasive means backing 20 is still separate from the abrasive particle carrier 18 in this method step 46 and is not sintered at the same time. In a next method step 48, the abrasive particle carrier 18 provided with the abrasive particles 16 is adhesively bonded onto the abrasive means backing 20 of the abrasive means 10. Furthermore (not illustrated here in greater detail), top binder is applied externally onto the abrasive particle carrier 18.

Further embodiments comprise the following aspects:

In one embodiment, a method for applying abrasive particles (12a-h) to an abrasive means backing (14a-h), wherein abrasive particles (12a-h) are purposefully placed onto the abrasive means backing (14a-h).

An embodiment wherein the abrasive particles (12a-h) are purposefully placed in abrasive particle groups (20a-h), which are arranged at a predefined distance from one another.

An embodiment wherein the abrasive particles (12a-d) are applied to adhesive elements (16a-d) applied at certain points on the abrasive means backing (14a-d).

An embodiment wherein the adhesive elements (16a) applied at certain points have at least one indentation (18a) for receiving the abrasive particles (12a).

An embodiment wherein the abrasive particles (12b) are oriented on the adhesive elements (16b), applied at certain points, by a surface tension generated by means of heating.

An embodiment wherein the abrasive particles (12a; 12d) are applied to the abrasive means backing (14a; 14d) at least substantially in the form of a spiral (22a; 22d).

An embodiment wherein the abrasive particles (12a) are applied substantially in the form of a Fibonacci spiral.

An embodiment wherein the abrasive particles (12d) are purposefully placed in an arrangement that is provided for purposeful generation of an airflow (28d) in an abrading operating mode.

An embodiment wherein free regions (38e-f) are obtained purposefully on the abrasive means backing (14e-f) by means of a part-retention device (32e-f) in a scattering process.

An embodiment wherein the abrasive particles (12g) are purposefully placed on an abrasive means backing (14g) by means of a shaft loading device (44g).

An embodiment wherein the abrasive particles (12g) are coated with adhesive (58g) on a support face (56g) prior to a transport in the shaft loading device (44g).

In one embodiment, a device producing an abrasive means (10a-h) in accordance with a method for applying abrasive particles (12a-h) to an abrasive means backing (14a-h), wherein abrasive particles (12a-h) are purposefully placed onto the abrasive means backing (14a-h).

In one embodiment an abrasive means is produced using a method for applying abrasive particles (12a-h) to an abrasive means backing (14a-h), wherein abrasive particles (12a-h) are purposefully placed onto the abrasive means backing (14a-h).

In another embodiment, a method for producing an abrasive means (10a-c), in which abrasive particles (12a-c) are scattered onto at least one abrasive means backing (14a-c), wherein the abrasive particles (12a-c) are scattered at least partially oriented by at least one orientation aid (20a-c).

An embodiment wherein the abrasive particles (12a) are oriented at least partially in a predefined scattering orientation by the at least one orientation aid (20a) prior to a scattering step.

An embodiment wherein the abrasive particles (12a) are at least partially oriented by at least one orientation aid (20a) formed as a vibration unit (22a).

An embodiment wherein the abrasive particles (12a) are at least partially oriented by at least one vibration unit (22a) formed at least partially integrally with a transport belt unit (16a).

An embodiment wherein the abrasive particles (12b) are at least partially oriented in a scattering step by at least one orientation aid (20b) formed as an airflow unit (28b).

An embodiment wherein the abrasive particles (12c) are at least partially oriented in a scattering step by at least one orientation aid (20c) comprising screen openings (24c).

An embodiment wherein a passage of abrasive particles (12c) through the screen openings (24c) is at least assisted by a screening aid unit (26c).

In one embodiment, a device carries out a method for applying abrasive particles (12a-h) to an abrasive means backing (14a-h), wherein abrasive particles (12a-h) are purposefully placed onto the abrasive means backing (14a-h).

In one embodiment, the device includes a vibration unit (22a;22c).

An embodiment wherein the vibration unit (22a) is formed at least partially integrally with a transport belt unit (16a).

In one embodiment, a device for applying abrasive particles (12a-b) to an abrasive means backing (14a-b), wherein at least one abrasive particle feed cylinder (16a-b) is provided, which on its lateral face (18*a-b*) has recesses (20*a-b*) for receiving in each case at least one abrasive particle (12*a-b*) and which is intended to apply the abrasive particles (12*a-b*) to the abrasive means backing (14*a-b*) at least substantially in a defined arrangement (22*a-b*).

An embodiment wherein the recesses (20*a-b*) are each designed to receive an individual abrasive particle (12*a-b*).

An embodiment wherein the recesses (20*a-b*) have a shape complementary to a geometry of the abrasive particles (12*a-b*).

An embodiment wherein an abrasive particle storage container (26*a-b*) is provided, which is arranged above the abrasive particle feed cylinder (16*a-b*) with respect to a direction of the force of gravity (24*a-b*) and which has at least one opening (28*a-b*) for a heaping of abrasive particles (12*a-b*) onto at least a portion (30*a-b*) of the lateral face (18*a-b*) of the abrasive particle feed cylinder (16*a-b*).

An embodiment wherein at least one stripping element (32*a-b*) is provided, which is intended to strip off abrasive particles (12*a-b*) resting on the lateral face (18*a-b*) outside the recesses (20*a-b*).

An embodiment wherein at least one retaining unit (34*a*) is provided, which is intended to cover a portion (36*a*) of a lateral cylinder face (38*a*) from an abrasive particle takeover region (40*a*) to an abrasive particle dispensing region (42*a*).

An embodiment wherein a vibration device (44*a*) is provided, which is intended to set in vibration the abrasive particle feed cylinder (16*a*) in order to assist a take-over and/or dispensing of the abrasive particles (12*a*).

An embodiment wherein an overpressure source (48*b*) connected in at least one portion (46*b*) of a lateral cylinder face (38*b*) in at least one operating state to the recesses (20*b*) is provided, which overpressure source is intended to dispense the abrasive particles (12*b*) from the recesses (20*b*) by applying an overpressure.

An embodiment wherein a negative pressure source (50*b*) connected in at least one portion (36*b*) of a lateral cylinder face (38*b*) in at least one operating state to the recesses (20*b*) is provided, which negative pressure source is intended to fix the abrasive particles (12*b*) in the recesses (20*b*) by applying a negative pressure.

In one embodiment, a method for producing an abrasive means (52*a-b*) includes a device (10*a-b*) for applying abrasive particles (12*a-b*) to an abrasive means backing (14*a-b*), wherein at least one abrasive particle feed cylinder (16*a-b*) is provided, which on its lateral face (18*a-b*) has recesses (20*a-b*) for receiving in each case at least one abrasive particle (12*a-b*) and which is intended to apply the abrasive particles (12*a-b*) to the abrasive means backing (14*a-b*) at least substantially in a defined arrangement (22*a-b*).

In one embodiment, an abrasive means includes a plurality of abrasive particles (12*a-b*) applied by means of a device (10*a-b*) for applying abrasive particles (12*a-b*) to an abrasive means backing (14*a-b*), wherein at least one abrasive particle feed cylinder (16*a-b*) is provided, which on its lateral face (18*a-b*) has recesses (20*a-b*) for receiving in each case at least one abrasive particle (12*a-b*) and which is intended to apply the abrasive particles (12*a-b*) to the abrasive means backing (14*a-b*) at least substantially in a defined arrangement (22*a-b*).

In one embodiment, a method for producing an abrasive means (10*a-b*), includes at least one heaping step, in which abrasive particles (14*a-b*) are heaped onto an abrasive means backing (12*a-b*), characterized in that the abrasive particles (14*a-b*) are oriented by means of an electromagnetic field during and/or after the at least one heaping step.

An embodiment wherein at least one method step for producing an abrasive particle (14*a*) is provided, in which abrasive particle intermediate products are provided at least partially with an electromagnetically effective coating (16*a*).

An embodiment wherein the abrasive particles (14*a*) are at least fixed to the abrasive means backing (12*a*) by means of magnets (22*a*).

An embodiment wherein the abrasive particles (14*a*) are at least fixed to the abrasive means backing (12*a*) by means of magnets (22*a*) arranged on a carrier unit (24*a*).

An embodiment wherein the magnets (22*a*) generate, on the abrasive means backing (12*a*), discrete abrasive points formed from at least fixed abrasive particles (14*a*).

An embodiment wherein unfixed abrasive particles (14*a*) are removed from the abrasive means backing (12*a*) in a separation step.

An embodiment wherein the unfixed abrasive particles (14) are separated by means of a separation method based on the force of gravity.

An embodiment wherein the abrasive particles (14*b*) are at least partially oriented by the electromagnetic field along a falling path (32*b*).

An embodiment wherein the abrasive particles (14*b*), for an at least partial orientation, pass through at least one screening region (40*b*) of the falling path (32*b*), which region is screened from the electromagnetic field, and at least one slot-like active region (42*b*) of the falling path (32*b*).

A device for carrying out a method as claimed in one of the embodiments 35 to 43.

In one embodiment, a method for producing an abrasive means (10), comprising a shaping means (12), which has cavities (14), into which a dispersion of abrasive particles (16) is introduced in order to shape the abrasive particles (16), wherein the abrasive particles (16) are placed on an abrasive particle carrier (18) of the abrasive means (10) in an arrangement given by an arrangement of the cavities (14) in the shaping means (12).

An embodiment wherein the shaping means (12) is passed by the abrasive particle carrier (18) of the abrasive means (10) for the placement of the abrasive particles (16) on the abrasive particle carrier (18).

An embodiment wherein the abrasive particles (16) are placed on the abrasive particle carrier (18), which is flexible.

An embodiment wherein the abrasive particle carrier (18) is adhesively bonded onto an abrasive means backing (20) of the abrasive means (10).

An embodiment wherein the abrasive particles (16) are sintered in the cavities (14) of the shaping means (12).

An embodiment wherein the abrasive particles (16) are applied to the abrasive particle carrier (18) following a sintering of the abrasive particles (16).

An embodiment wherein the abrasive particles (16) are applied in a green state from the cavities (14) of the shaping means (12) to the abrasive particle carrier (18).

An embodiment wherein the abrasive particles (16) and the abrasive particle carrier (18) are sintered jointly.

The invention claimed is:

1. An abrasive member, comprising:
   an abrasive member backing; and
   a plurality of abrasive particles applied to the abrasive member backing,
   wherein at least a large proportion of the abrasive particles form at least one abrasive edge unit having an abrasive edge inclined at an angle between 0° and 90° relative to a defined machining direction of the abrasive member, wherein each abrasive particle of the at least one abrasive edge unit has at least one edge that is oriented at the angle, the abrasive edge defined by the edges of the abrasive particles, and wherein the at least one abrasive edge unit is configured as a row of abrasive particles arranged directly adjacently.

2. The abrasive member as claimed in claim 1, wherein the abrasive edge is inclined at a defined angle between 0° and 90° relative to the defined machining direction and the defined angle is set purposely.

3. The abrasive member as claimed in claim 1, wherein the abrasive particles are applied to the abrasive member backing with one or more of a defined orientation and/or a defined position.

4. The abrasive member as claimed in claim 1, wherein the abrasive member backing is configured as a cylindrical roller.

5. The abrasive member as claimed in claim 1, wherein the abrasive particles have a surface contour described at least substantially by a convex envelope.

6. The abrasive member as claimed in claim 1, wherein the abrasive particles have a ratio between a height of the abrasive particles and a diameter of a base area having a value between 0.3 and 1.2.

7. The abrasive member as claimed in claim 1, wherein the abrasive particles have at least substantially a pyramidal basic shape.

8. The abrasive member as claimed in claim 1, wherein the abrasive particles comprise at least one partially prismatically configured sub-element.

9. The abrasive member as claimed in claim 1, wherein the abrasive particles have a hexagonal base area.

10. The abrasive member as claimed in claim 1, wherein the abrasive particles have a quadrangular base area.

11. The abrasive member as claimed in claim 1, wherein the abrasive particles have an oval base area.

12. The abrasive member as claimed in claim 1, wherein the abrasive particles have at least one setback surface region that is configured at least partially as a groove, the groove defining a predetermined breaking point for a portion of each of the abrasive particles to break off from the respective abrasive particle in a controlled manner.

13. An abrasive particle for an abrasive member, comprising:

a body having a plurality of surfaces, a portion of the body in which two surfaces of the abrasive particle converge define an edge, wherein the abrasive particle is configured as one of a plurality of abrasive particles applied to an abrasive member backing, wherein the abrasive particle and a large proportion of the plurality of abrasive particles form at least one abrasive edge unit having an abrasive edge inclined at an angle between 0° and 90° relative to a defined machining direction, the edge of the abrasive particle is oriented at the angle and defines a portion of the abrasive edge of the abrasive edge unit, and wherein the abrasive particles of the abrasive edge unit each have a base body, the abrasive edge unit being configured as a row of abrasive particles with the base bodies of the abrasive particles in the row being interconnected.

14. The abrasive member as claimed in claim 1, wherein the abrasive edge is defined by the oriented edge of each of the abrasive particles.

15. The abrasive member as claimed in claim 1, wherein the abrasive particles of the abrasive edge unit each have a base body, and wherein the base bodies of the abrasive particles in the row are interconnected.

16. The abrasive member as claimed in claim 2, wherein the defined angle is set purposely by an application method.

17. An abrasive member, comprising:

an abrasive member backing; and a plurality of abrasive particles applied to the abrasive member backing, wherein at least a large proportion of the abrasive particles form at least one abrasive edge unit having an abrasive edge inclined at an angle between 0° and 90° relative to a defined machining direction of the abrasive member, wherein each abrasive particle of the at least one abrasive edge unit has at least one edge that is oriented at the angle, the abrasive edge defined by the edges of the abrasive particles, wherein the at least one abrasive edge unit is configured as a row of abrasive particles arranged directly adjacently, and wherein the abrasive particles of the abrasive edge unit each have a base body, the base bodies of the abrasive particles in the row being interconnected.

* * * * *

UNITED STATES PATENT AND TRADEMARK OFFICE
CERTIFICATE OF CORRECTION

PATENT NO. : 9,969,057 B2
APPLICATION NO. : 14/901071
DATED : May 15, 2018
INVENTOR(S) : Beat Eugster et al.

It is certified that error appears in the above-identified patent and that said Letters Patent is hereby corrected as shown below:

On the Title Page

Item (72) should read:
Inventors: Beat Eugster, Buhwil TG (CH); Georg Hejtmann, Mundelsheim (DE); Thomas Rohner, Kefikon (CH); Roman Zaech, Mettlen (CH); Ralf Materna, Greifensee (CH); Adrian Schoch, Warth (CH); Jiri Misak, Dübendorf (CH); Petra Stedile, Esslingen (DE); Peter Eggenberger, Schönenberg (CH); Stefan Fuenfschilling, Öhningen (DE)

Signed and Sealed this
Ninth Day of April, 2019

Andrei Iancu
*Director of the United States Patent and Trademark Office*